United States Patent [19]

Matsumoto

[11] Patent Number: 4,727,399
[45] Date of Patent: Feb. 23, 1988

[54] PHOTOGRAPHIC PRINTER AND METHOD FOR DETECTING AND POSITIONING FRAMES

[75] Inventor: Fumio Matsumoto, Tokyo, Japan

[73] Assignee: Fuji Photo Film Co., Ltd., Minami-ashigara, Japan

[21] Appl. No.: 791,997

[22] Filed: Oct. 23, 1985

[30] Foreign Application Priority Data

Nov. 1, 1984 [JP] Japan ................. 59-230642
Nov. 1, 1984 [JP] Japan ................. 59-230643
Aug. 1, 1985 [JP] Japan ................. 60-170101
Aug. 26, 1985 [JP] Japan ................. 60-185793

[51] Int. Cl.⁴ .................................... G03B 27/52
[52] U.S. Cl. ................................. 355/41; 355/68; 250/557; 250/561; 250/571
[58] Field of Search ............... 355/40, 41, 38, 68; 356/443, 444; 250/557, 559–561, 571

[56] References Cited

U.S. PATENT DOCUMENTS 3,469,105  9/1969  Stasey ........................... 250/561
4,176,944 12/1979  Payrhammer ................ 355/41 X
4,611,907  9/1986  Inatsuki ........................ 355/41

*Primary Examiner*—L. T. Hix
*Assistant Examiner*—D. Rutledge
*Attorney, Agent, or Firm*—Wenderoth, Lind & Ponack

[57] ABSTRACT

A photographic printer according to the present invention can automatically print films of an arbitrary size by directly and automatically detecting image data of a film negative to discriminate whether the firm negative is of a full or half size, and switches the conveying direction of the film based upon the result of the above discrimination, and adjusts the aperture of the mask at a printing unit. The method according to the present invention can detect and position frames at a high speed and high accuracy and yet with a simple structure which includes the steps of detecting image data of an original film, and determining a feeding length with the size data and edge detection of the original film and positioning imaged frames.

17 Claims, 57 Drawing Figures

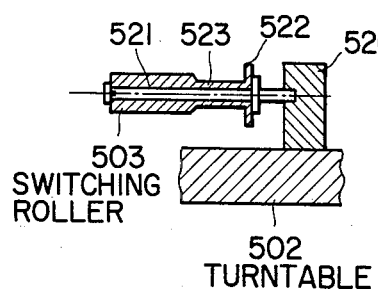
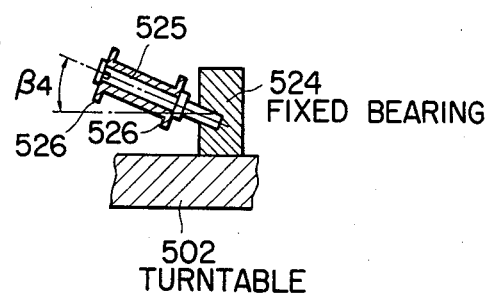
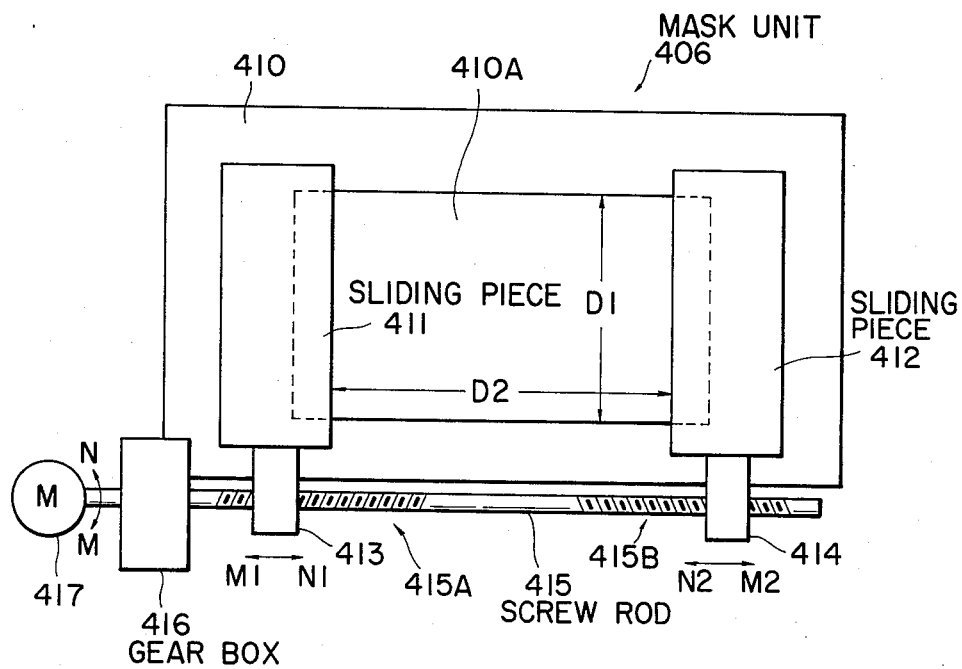

FIG. 14A
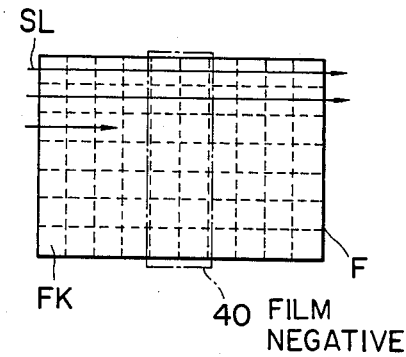
FIG. 14B
FIG. 15
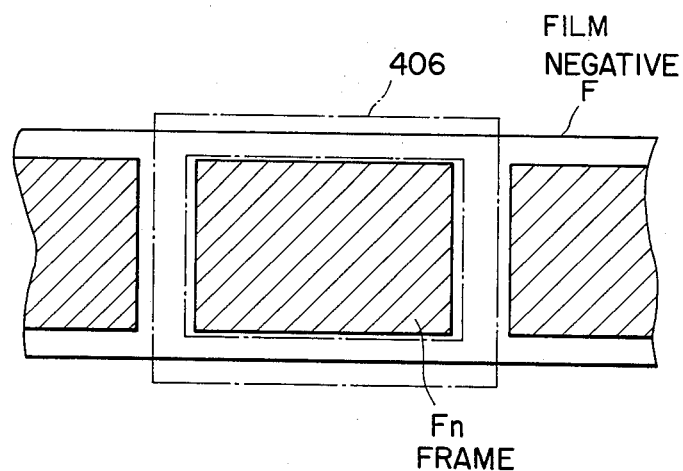

FIG. 16A

| L1↓ | | | | | | | | | | L2↓ |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 254 | * | * | * | * | * | * | * | * | * | 254 |
| 255 | * | * | * | * | * | * | * | * | * | 253 |
| 254 | * | * | * | * | * | * | * | * | * | 255 |
| 253 | * | * | * | * | * | * | * | * | * | 255 |
| 254 | * | * | * | * | * | * | * | * | * | 254 |
| 255 | * | * | * | * | * | * | * | * | * | 254 |
| 255 | * | * | * | * | * | * | * | * | * | 254 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

FIG. 16B

| L1↓ | | | | | L3↓ | | | | | L2↓ |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 255 | * | * | * | * | 255 | * | * | * | * | 254 |
| 254 | * | * | * | * | 255 | * | * | * | * | 253 |
| 253 | * | * | * | * | 254 | * | * | * | * | 254 |
| 253 | * | * | * | * | 253 | * | * | * | * | 254 |
| 254 | * | * | * | * | 254 | * | * | * | * | 255 |
| 255 | * | * | * | * | 255 | * | * | * | * | 255 |
| 255 | * | * | * | * | 254 | * | * | * | * | 255 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

FIG. 18A

| 32 | 36 | 35 | 31 | 33 | 35 | 37 | 36 | 37 | 35 | 40 |
|----|----|----|----|----|----|----|----|----|----|----|
| 31 | 6  | 4  | 5  | 3  | 2  | 5  | 4  | 6  | 8  | 42 |
| 34 | 0  | 0  | 0  | 0  | 0  | 0  | 0  | 0  | 0  | 38 |
| 33 | 0  | 0  | 0  | 0  | 0  | 0  | 0  | 0  | 0  | 35 |
| 35 | 0  | 0  | 0  | 0  | 0  | 0  | 0  | 0  | 0  | 37 |
| 36 | 0  | 0  | 0  | 0  | 0  | 0  | 0  | 0  | 0  | 36 |
| 33 | 0  | 0  | 0  | 0  | 0  | 0  | 0  | 0  | 0  | 38 |
| 34 | 0  | 0  | 0  | 0  | 0  | 0  | 0  | 0  | 0  | 40 |
| 32 | 0  | 0  | 0  | 0  | 0  | 0  | 0  | 0  | 0  | 38 |
| 35 | 7  | 5  | 6  | 3  | 4  | 5  | 4  | 7  | 6  | 42 |
| 36 | 39 | 41 | 39 | 42 | 45 | 42 | 44 | 43 | 41 | 43 |

FIG. 18B

| 160 | 110 | 105 | 109 | 111 | 123 | 115 | 117 | 110 | 119 | 185 |
|-----|-----|-----|-----|-----|-----|-----|-----|-----|-----|-----|
| 183 | 107 | 60  | 68  | 70  | 73  | 65  | 70  | 53  | 120 | 190 |
| 153 | 109 | 40  | 38  | 35  | 32  | 34  | 33  | 30  | 123 | 173 |
| 142 | 105 | 32  | 0   | 0   | 0   | 0   | 0   | 35  | 120 | 165 |
| 156 | 108 | 31  | 0   | 0   | 0   | 0   | 0   | 34  | 150 | 171 |
| 146 | 102 | 38  | 0   | 0   | 0   | 0   | 0   | 37  | 135 | 183 |
| 175 | 111 | 33  | 0   | 0   | 0   | 0   | 0   | 38  | 128 | 180 |
| 160 | 103 | 41  | 0   | 0   | 0   | 0   | 0   | 35  | 129 | 171 |
| 183 | 105 | 39  | 32  | 35  | 40  | 38  | 33  | 37  | 130 | 168 |
| 170 | 121 | 50  | 65  | 68  | 79  | 93  | 80  | 40  | 153 | 171 |
| 153 | 111 | 100 | 120 | 113 | 113 | 118 | 123 | 98  | 140 | 180 |

FIG. 21A

| 150 | 141 | 137 | 121 | 138 | 148 | 151 | 140 | 133 | 135 | 120 | 122 | 108 | 133 | 123 | 130 | 145 | 150 |
|---|---|---|---|---|---|---|---|---|---|---|---|---|---|---|---|---|---|
| 148 | 132 | 71 | 50 | 61 | 70 | 85 | 80 | 70 | 72 | 65 | 81 | 76 | 85 | 80 | 115 | 148 | 153 |
| 151 | 140 | 70 | 43 | 20 | 13 | 15 | 14 | 16 | 15 | 14 | 16 | 15 | 18 | 78 | 103 | 150 | 155 |
| 150 | 135 | 69 | 41 | 18 | 5 | 4 | 5 | 6 | 4 | 5 | 7 | 6 | 17 | 69 | 94 | 142 | 150 |
| 142 | 122 | 60 | 38 | 17 | 6 | 0 | 0 | 0 | 0 | 0 | 0 | 8 | 15 | 53 | 82 | 131 | 141 |
| 139 | 120 | 55 | 33 | 15 | 5 | 0 | 0 | 0 | 0 | 0 | 0 | 7 | 16 | 58 | 88 | 140 | 145 |
| 138 | 120 | 62 | 40 | 19 | 8 | 0 | 0 | 0 | 0 | 0 | 0 | 6 | 14 | 43 | 70 | 110 | 140 |
| 143 | 125 | 65 | 40 | 18 | 7 | 0 | 0 | 0 | 0 | 0 | 0 | 8 | 17 | 47 | 73 | 108 | 148 |
| 147 | 130 | 80 | 48 | 21 | 6 | 7 | 5 | 4 | 6 | 5 | 7 | 7 | 20 | 55 | 81 | 120 | 155 |
| 150 | 138 | 89 | 52 | 30 | 20 | 18 | 13 | 10 | 17 | 15 | 18 | 20 | 25 | 40 | 73 | 115 | 153 |
| 153 | 144 | 93 | 65 | 54 | 51 | 46 | 38 | 32 | 45 | 43 | 48 | 58 | 60 | 65 | 80 | 105 | 148 |
| 155 | 151 | 155 | 140 | 113 | 110 | 119 | 120 | 140 | 150 | 151 | 140 | 151 | 155 | 150 | 150 | 152 | 150 |

FIG. 21B

| 53 | 38 | 28 | 26 | 27 | 29 | 27 | 25 | 25 | 30 | 35 | 33 | 31 | 29 | 36 | 37 | 49 | 71 |
|---|---|---|---|---|---|---|---|---|---|---|---|---|---|---|---|---|---|
| 50 | 31 | 5 | 4 | 5 | 7 | 6 | 4 | 4 | 6 | 7 | 7 | 5 | 4 | 5 | 6 | 40 | 64 |
| 61 | 35 | 6 | 0 | 0 | 0 | 0 | 0 | 0 | 0 | 0 | 0 | 0 | 0 | 0 | 8 | 43 | 67 |
| 50 | 28 | 4 | 0 | 0 | 0 | 0 | 0 | 0 | 0 | 0 | 0 | 0 | 0 | 0 | 6 | 37 | 63 |
| 48 | 28 | 4 | 0 | 0 | 0 | 0 | 0 | 0 | 0 | 0 | 0 | 0 | 0 | 0 | 6 | 37 | 62 |
| 61 | 33 | 5 | 0 | 0 | 0 | 0 | 0 | 0 | 0 | 0 | 0 | 0 | 0 | 0 | 7 | 39 | 68 |
| 73 | 42 | 7 | 0 | 0 | 0 | 0 | 0 | 0 | 0 | 0 | 0 | 0 | 0 | 0 | 5 | 35 | 65 |
| 70 | 45 | 7 | 0 | 0 | 0 | 0 | 0 | 0 | 0 | 0 | 0 | 0 | 0 | 0 | 5 | 35 | 66 |
| 66 | 38 | 5 | 0 | 0 | 0 | 0 | 0 | 0 | 0 | 0 | 0 | 0 | 0 | 0 | 6 | 38 | 70 |
| 68 | 39 | 6 | 0 | 0 | 0 | 0 | 0 | 0 | 0 | 0 | 0 | 0 | 0 | 0 | 8 | 43 | 78 |
| 79 | 45 | 8 | 7 | 7 | 5 | 6 | 3 | 3 | 5 | 4 | 5 | 3 | 4 | 4 | 8 | 45 | 72 |
| 80 | 50 | 41 | 38 | 38 | 35 | 37 | 30 | 33 | 37 | 35 | 40 | 33 | 35 | 38 | 43 | 61 | 77 |

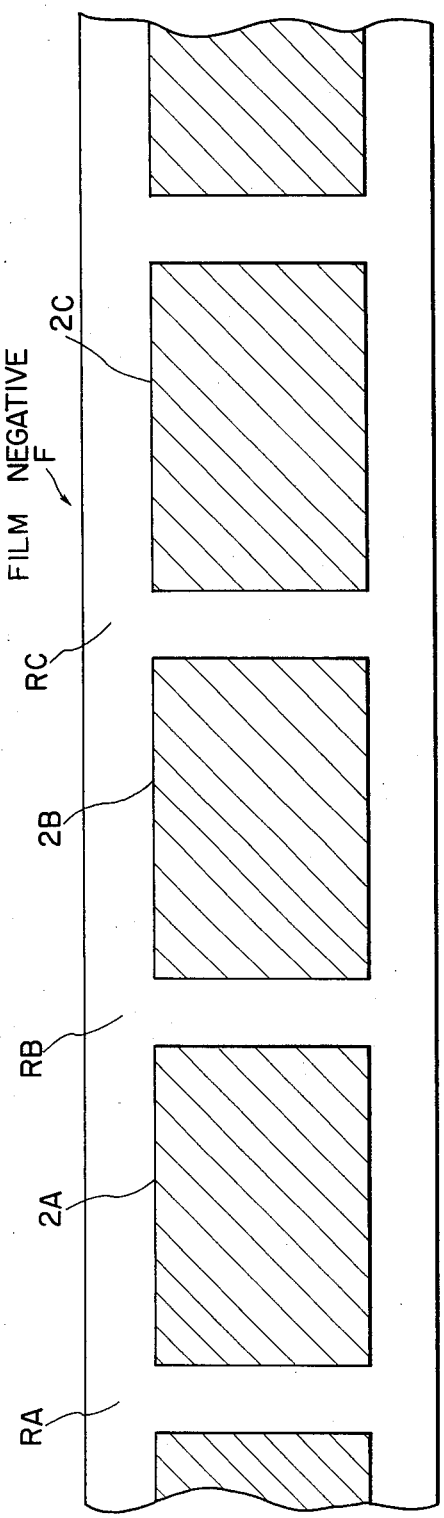

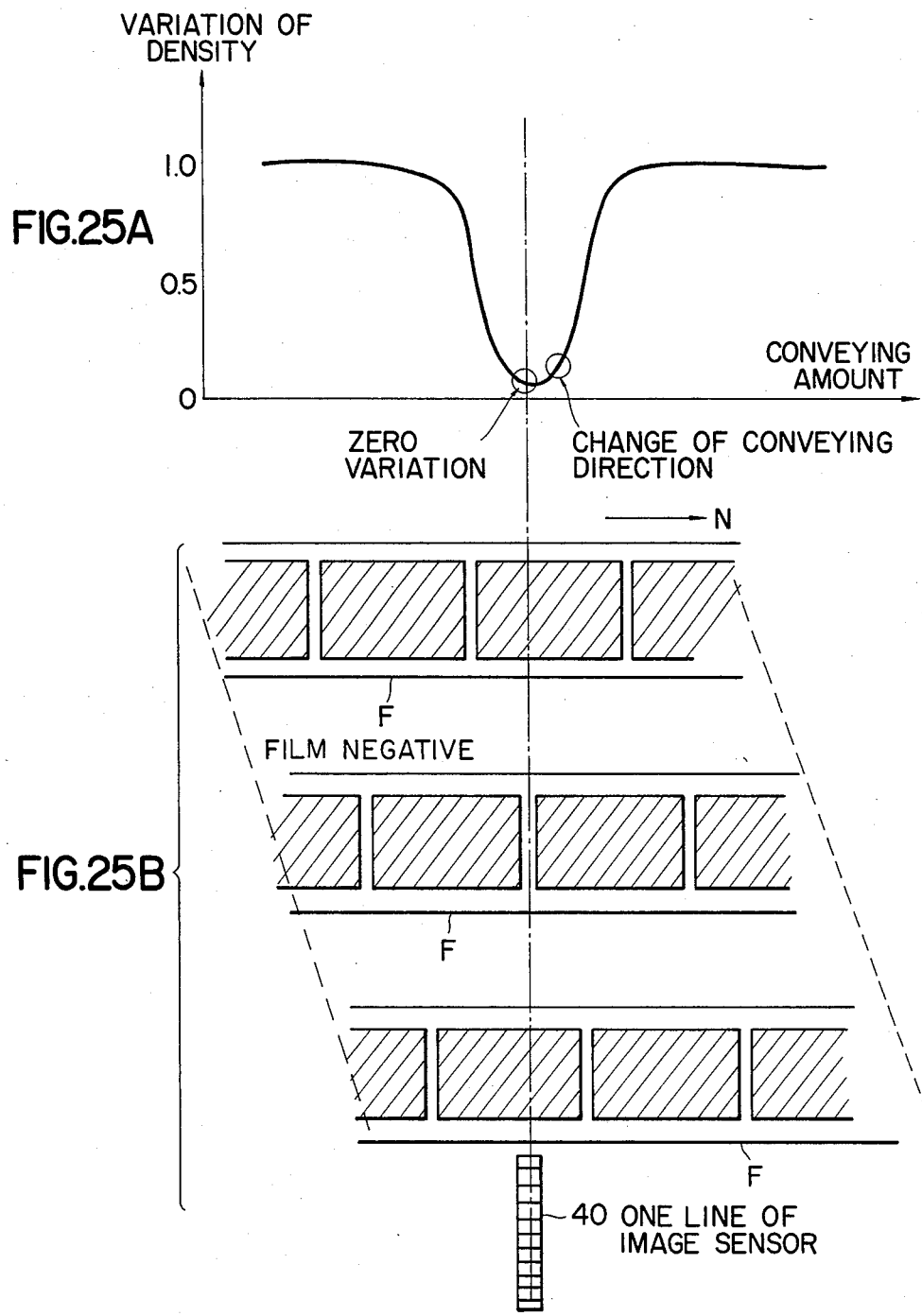

FIG. 29A

| 145 | 136 | 120 | 123 | 128 | 135 | 136 | 140 | 153 | 150 |
|---|---|---|---|---|---|---|---|---|---|
| 150 | 142 | 119 | 120 | 125 | 127 | 129 | 133 | 142 | 152 |
| 155 | 148 | 49 | 53 | 52 | 60 | 58 | 17 | 130 | 158 |
| 152 | 150 | 35 | 13 | 14 | 15 | 15 | 8 | 126 | 157 |
| 153 | 152 | 31 | 0 | 0 | 0 | 0 | 4 | 120 | 156 |
| 155 | 147 | 29 | 0 | 0 | 0 | 0 | 3 | 115 | 155 |
| 157 | 145 | 31 | 0 | 0 | 0 | 0 | 1 | 108 | 152 |
| 155 | 150 | 34 | 12 | 14 | 14 | 18 | 24 | 110 | 155 |
| 150 | 148 | 42 | 45 | 52 | 54 | 65 | 73 | 120 | 153 |
| 145 | 150 | 108 | 110 | 115 | 118 | 126 | 130 | 132 | 152 |
| 143 | 152 | 155 | 157 | 160 | 160 | 155 | 150 | 145 | 150 |

FIG. 29B

| 32 | 36 | 35 | 33 | 31 | 37 | 36 | 37 | 35 | 40 |
|---|---|---|---|---|---|---|---|---|---|
| 30 | 5 | 4 | 3 | 2 | 5 | 4 | 6 | 8 | 42 |
| 33 | 0 | 0 | 0 | 0 | 0 | 0 | 0 | 0 | 39 |
| 34 | 0 | 0 | 0 | 0 | 0 | 0 | 0 | 0 | 37 |
| 35 | 0 | 0 | 0 | 0 | 0 | 0 | 0 | 0 | 36 |
| 36 | 0 | 0 | 0 | 0 | 0 | 0 | 0 | 0 | 37 |
| 36 | 0 | 0 | 0 | 0 | 0 | 0 | 0 | 0 | 39 |
| 35 | 0 | 0 | 0 | 0 | 0 | 0 | 0 | 0 | 40 |
| 34 | 0 | 0 | 0 | 0 | 0 | 0 | 0 | 0 | 42 |
| 35 | 7 | 6 | 5 | 5 | 6 | 5 | 4 | 6 | 43 |
| 36 | 38 | 39 | 40 | 42 | 44 | 43 | 42 | 40 | 42 |

FIG. 35

| 4 | 16 | 17 | 11 | 7 | 8 | 12 | 7 | 7 | 4 | 6 | 8 | 7 | 6 | 5 | 4 | 3 | 6 | 7 | 6 |
|---|---|---|---|---|---|---|---|---|---|---|---|---|---|---|---|---|---|---|---|
| 5 | 15 | 14 | 10 | 6 | 9 | 11 | 6 | 6 | 3 | 7 | 9 | 6 | 7 | 4 | 4 | 5 | 7 | 8 | 6 |
| 6 | 14 | 13 | 9 | 8 | 10 | 10 | 5 | 8 | 4 | 7 | 10 | 5 | 7 | 0 | 0 | 0 | 0 | 9 | 6 |
| 6 | 13 | 12 | 8 | 9 | 11 | 8 | 8 | 9 | 5 | 6 | 11 | 4 | 6 | 0 | 0 | 0 | 0 | 8 | 6 |
| 7 | 9 | 126 | 140 | 138 | 170 | 184 | 167 | 150 | 133 | 121 | 108 | 4 | 5 | 0 | 0 | 0 | 0 | 7 | 6 |
| 6 | 8 | 134 | 155 | 143 | 145 | 211 | 177 | 138 | 120 | 115 | 107 | 6 | 4 | 5 | 6 | 7 | 3 | 6 | 5 |
| 5 | 5 | 145 | 160 | 165 | 133 | 234 | 189 | 123 | 101 | 106 | 105 | 7 | 3 | 25 | 26 | 27 | 25 | 5 | 5 |
| 4 | 6 | 182 | 177 | 180 | 128 | 248 | 200 | 110 | 72 | 98 | 108 | 6 | 4 | 4 | 5 | 4 | 3 | 4 | 4 |
| 3 | 6 | 190 | 194 | 201 | 134 | 250 | 228 | 80 | 68 | 82 | 98 | 8 | 3 | 3 | 18 | 20 | 4 | 3 | 6 |
| 7 | 7 | 200 | 210 | 199 | 212 | 251 | 234 | 77 | 60 | 77 | 85 | 9 | 6 | 2 | 17 | 19 | 5 | 4 | 6 |
| 6 | 8 | 7 | 4 | 6 | 10 | 9 | 8 | 5 | 6 | 5 | 4 | 8 | 7 | 3 | 20 | 16 | 6 | 6 | 7 |
| 8 | 9 | 6 | 3 | 7 | 11 | 8 | 7 | 4 | 7 | 4 | 3 | 7 | 8 | 6 | 6 | 6 | 7 | 7 | 7 |
| 9 | 12 | 5 | 2 | 8 | 12 | 7 | 6 | 3 | 7 | 4 | 3 | 6 | 9 | 7 | 7 | 5 | 7 | 8 | 8 |
| 10 | 11 | 5 | 4 | 9 | 8 | 6 | 6 | 3 | 8 | 3 | 6 | 5 | 8 | 8 | 7 | 5 | 7 | 9 | 8 |

FIG. 36

| 4 | 16 | 17 | 11 | 7 | 8 | 12 | 7 | 7 | 4 | 6 | 8 | 7 | 6 | 5 | 4 | 3 | 6 | 7 | 6 |
|---|---|---|---|---|---|---|---|---|---|---|---|---|---|---|---|---|---|---|---|
| 5 | 15 | 14 | 10 | 6 | 9 | 11 | 6 | 6 | 3 | 7 | 9 | 6 | 7 | 4 | 4 | 5 | 7 | 8 | 6 |
| 6 | 14 | 13 | 9 | 8 | 10 | 10 | 5 | 8 | 4 | 7 | 10 | 5 | 7 | 0 | 0 | 0 | 0 | 9 | 6 |
| 6 | 13 | 12 | 8 | 9 | 11 | 8 | 8 | 9 | 5 | 6 | 11 | 4 | 6 | 0 | 0 | 0 | 0 | 8 | 6 |
| 7 | 9 | 0 | 0 | 0 | 0 | 0 | 0 | 0 | 0 | 0 | 0 | 4 | 5 | 0 | 0 | 0 | 0 | 7 | 6 |
| 6 | 8 | 0 | 0 | 0 | 0 | 0 | 0 | 0 | 0 | 0 | 0 | 6 | 4 | 5 | 6 | 7 | 3 | 6 | 5 |
| 5 | 5 | 0 | 0 | 0 | 0 | 0 | 0 | 0 | 0 | 0 | 0 | 7 | 3 | 25 | 26 | 27 | 25 | 5 | 5 |
| 4 | 6 | 0 | 0 | 0 | 0 | 0 | 0 | 0 | 0 | 0 | 0 | 6 | 4 | 4 | 5 | 4 | 3 | 4 | 4 |
| 3 | 6 | 0 | 0 | 0 | 0 | 0 | 0 | 0 | 0 | 0 | 0 | 8 | 3 | 3 | 18 | 20 | 4 | 3 | 6 |
| 7 | 7 | 0 | 0 | 0 | 0 | 0 | 0 | 0 | 0 | 0 | 0 | 9 | 6 | 2 | 17 | 19 | 5 | 4 | 6 |
| 6 | 8 | 7 | 4 | 6 | 10 | 9 | 8 | 5 | 6 | 5 | 4 | 8 | 7 | 3 | 20 | 16 | 6 | 6 | 7 |
| 8 | 9 | 6 | 3 | 7 | 11 | 8 | 7 | 4 | 7 | 4 | 3 | 7 | 8 | 6 | 6 | 6 | 7 | 7 | 7 |
| 9 | 12 | 5 | 2 | 8 | 12 | 7 | 6 | 3 | 7 | 4 | 3 | 6 | 9 | 7 | 7 | 5 | 7 | 8 | 8 |
| 10 | 11 | 5 | 4 | 9 | 8 | 6 | 6 | 3 | 8 | 3 | 6 | 5 | 8 | 8 | 7 | 5 | 7 | 9 | 8 |

FIG. 40A
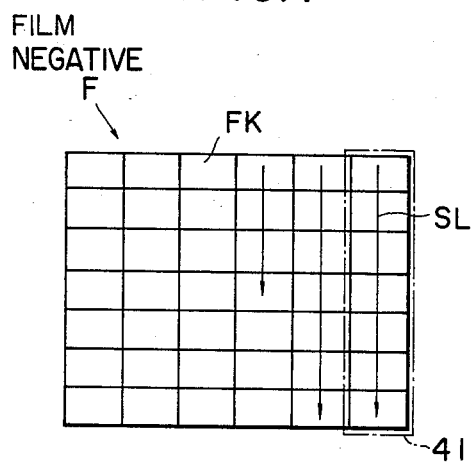
FIG. 40B
FIG. 42
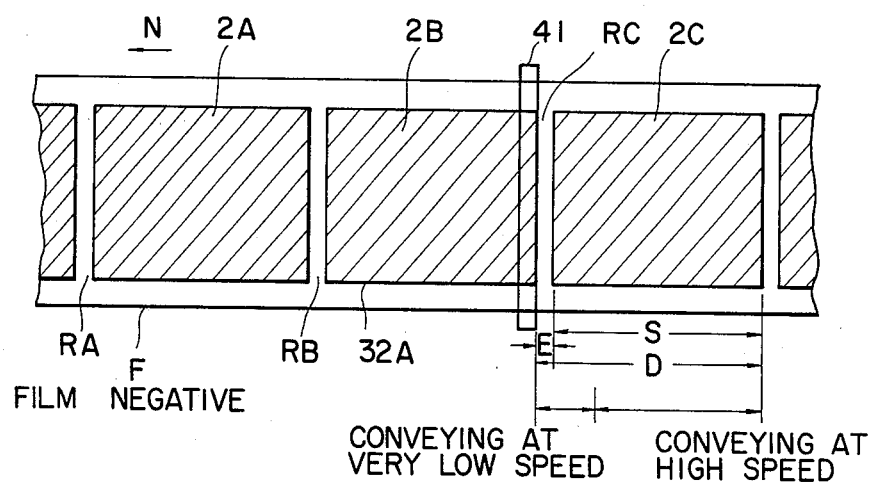

FIG.41A

| 135 |
|-----|
| 72  |
| 14  |
| 6   |
| 0   |
| 0   |
| 0   |
| 0   |
| 6   |
| 10  |
| 32  |
| 120 |

FIG.41C

| 150 | 141 | 137 | 121 | 138 | 148 | 151 | 140 | 133 | 135 | 120 | 122 | 108 | 133 | 123 | 130 | 145 | 150 |
|---|---|---|---|---|---|---|---|---|---|---|---|---|---|---|---|---|---|
| 148 | 132 | 71 | 50 | 61 | 70 | 85 | 80 | 70 | 72 | 65 | 81 | 76 | 85 | 80 | 115 | 148 | 153 |
| 151 | 140 | 70 | 43 | 20 | 13 | 15 | 14 | 16 | 15 | 14 | 16 | 15 | 18 | 78 | 103 | 150 | 155 |
| 150 | 135 | 69 | 41 | 18 | 5 | 4 | 5 | 6 | 4 | 5 | 7 | 6 | 17 | 69 | 94 | 142 | 150 |
| 142 | 122 | 60 | 38 | 17 | 6 | 0 | 0 | 0 | 0 | 0 | 0 | 8 | 15 | 53 | 82 | 131 | 141 |
| 139 | 120 | 55 | 33 | 15 | 5 | 0 | 0 | 0 | 0 | 0 | 0 | 7 | 16 | 58 | 88 | 140 | 145 |
| 138 | 120 | 62 | 40 | 19 | 8 | 0 | 0 | 0 | 0 | 0 | 0 | 6 | 14 | 43 | 70 | 110 | 140 |
| 143 | 125 | 65 | 40 | 18 | 7 | 0 | 0 | 0 | 0 | 0 | 0 | 8 | 17 | 47 | 73 | 108 | 148 |
| 147 | 130 | 80 | 48 | 21 | 6 | 7 | 5 | 4 | 6 | 5 | 7 | 7 | 20 | 55 | 81 | 120 | 155 |
| 150 | 138 | 89 | 52 | 30 | 20 | 18 | 13 | 10 | 17 | 15 | 18 | 20 | 25 | 40 | 73 | 115 | 153 |
| 153 | 144 | 93 | 65 | 54 | 51 | 46 | 38 | 32 | 45 | 43 | 48 | 58 | 60 | 65 | 80 | 105 | 148 |
| 155 | 151 | 155 | 140 | 113 | 110 | 119 | 120 | 140 | 150 | 151 | 140 | 151 | 155 | 150 | 150 | 152 | 150 |

FIG.41B

| 30 |
|----|
| 6  |
| 0  |
| 0  |
| 0  |
| 0  |
| 0  |
| 0  |
| 0  |
| 0  |
| 5  |
| 37 |

FIG.41D

| 53 | 38 | 28 | 26 | 27 | 29 | 27 | 25 | 25 | 30 | 35 | 33 | 31 | 29 | 36 | 37 | 49 | 71 |
|---|---|---|---|---|---|---|---|---|---|---|---|---|---|---|---|---|---|
| 50 | 31 | 5 | 4 | 5 | 7 | 6 | 4 | 4 | 6 | 7 | 7 | 5 | 4 | 5 | 6 | 40 | 64 |
| 61 | 35 | 6 | 0 | 0 | 0 | 0 | 0 | 0 | 0 | 0 | 0 | 0 | 0 | 0 | 8 | 43 | 67 |
| 50 | 28 | 4 | 0 | 0 | 0 | 0 | 0 | 0 | 0 | 0 | 0 | 0 | 0 | 0 | 6 | 37 | 63 |
| 48 | 28 | 4 | 0 | 0 | 0 | 0 | 0 | 0 | 0 | 0 | 0 | 0 | 0 | 0 | 6 | 37 | 62 |
| 61 | 33 | 5 | 0 | 0 | 0 | 0 | 0 | 0 | 0 | 0 | 0 | 0 | 0 | 0 | 7 | 39 | 68 |
| 73 | 42 | 7 | 0 | 0 | 0 | 0 | 0 | 0 | 0 | 0 | 0 | 0 | 0 | 0 | 5 | 35 | 65 |
| 70 | 45 | 7 | 0 | 0 | 0 | 0 | 0 | 0 | 0 | 0 | 0 | 0 | 0 | 0 | 5 | 35 | 66 |
| 66 | 38 | 5 | 0 | 0 | 0 | 0 | 0 | 0 | 0 | 0 | 0 | 0 | 0 | 0 | 6 | 38 | 70 |
| 68 | 39 | 6 | 0 | 0 | 0 | 0 | 0 | 0 | 0 | 0 | 0 | 0 | 0 | 0 | 8 | 43 | 78 |
| 79 | 45 | 8 | 7 | 7 | 5 | 6 | 3 | 3 | 5 | 4 | 5 | 3 | 4 | 4 | 8 | 45 | 72 |
| 80 | 50 | 41 | 38 | 38 | 35 | 37 | 30 | 33 | 37 | 35 | 40 | 33 | 35 | 38 | 43 | 61 | 77 |

PHOTOGRAPHIC PRINTER AND METHOD FOR DETECTING AND POSITIONING FRAMES

BACKGROUND OF THE INVENTION

This invention relates to a photographic printer which detects automatically from the data on a predetermined area of pixel segments whether the size of a film is a full size or a half size, and controls the printing aperture in the proper direction according to the data, and adjusts the opening of a mask of a printer opening, and further relates to a method for detecting and positioning frames of a film in the above mentioned photographic printers which can automatically detect and position an imaged frame in accordance with the size data on the original film, such as a film negative.

A size 135 film negative is exposed in frames of two sizes, i.e. a full size and a half size, except for special cases. A full-size frame is a rectangle having a longer side in the longitudinal direction thereof while a half-sized frame is a rectangle having a shorter side in the longitudinal direction thereof. When negative images photographed in such frames of different sizes and shapes are printed on a roll of photographic paper of a predetermined width, unless the full sized frame and the half sized frame are aligned in the proper direction by some means, they cannot be printed effectively by the same photographic printer on a photographic paper of the same size.

In the prior art, discrimination of a film negative into a full size or a half size is conducted by connecting films into an elongated length, inspecting the connected films visually or by a separate device, cutting a notch or applying a mark on a portion of the film or on a joint to be used as a means of memory, or storing such marks in a separate memory means such as a paper tape or a magnetic tape. This involves quite a troublesome procedure. Moreover, it is necessary to accurately position an imaged frame of an original film onto an optical frame at a photographic printer in order to print images in the frame optimally on a photographic paper. In the prior art, an optical sensor or mechanical sensor detects perforations which are provided on an original film at the rate of 1:1 with respect to original imaged frames or notches cut on the periphery of the film negative to position the frame. This conventional method, however, needs a projector and a light receiver arranged close to an optical frame for each optical sensor, or a microswitch for each mechanical sensor. Since sensors must be installed at particular positions, the structure inevitably becomes complicated and requires a great deal of labor to adjust the sensitivity or position.

There has been proposed another method which positions a frame by feeding a predetermined length of an original film, but this is defective in that positional deviation accumulates so as to deteriorate precision. Another method has been proposed to provide an optical sensor, such as a photodiode close to the periphery of the optical frame in the form suitable for the frames of the original film to directly detect frames of images and thereby position the frame in accordance with the result of detection by each optical sensor or sequential order. This requires a complicated control algorithm, however.

SUMMARY OF THE INVENTION

This invention was contrived from the aforementioned point of view and aims at providing a photographic printer which can automatically print films of an arbitrary size by directly and automatically detecting image data of a film negative to discriminate whether the film negative is of a full size or of a half size, and then switching the conveying direction of the film based upon the result of the above discrimination, and then adjusting the aperture of the mask at a printing unit.

Another object of this invention is to provide a method for detecting and positioning image frames at a high speed and high accuracy and yet with a simple structure which comprises the steps of detecting image data of an original film such as a film negative, determining a feeding length with the size data and edge detection of the original film and positioning imaged frames.

Still another object of this invention is to provide a method for detecting and positioning imaged frames at a high speed and high accuracy and yet with a simple structure which comprises the steps of detecting perforations or notches which are positionally given on the film negative at the rate of 1:1 with respect to frames with an image sensor and positioning imaged frames of the film negative.

Furthermore, still another object of this invention is to provide a method for detecting and positioning imaged frames at a high speed and high accuracy and yet with a simple structure which comprises the steps of detecting edges between imaged frames on an original film with image data of the film negative obtained photometrically, and determining a feeding length in correspondence with the size of a particular frame and positioning the frame.

The nature, principle and utility of th invention will become more apparent from the following detailed description when read in conjunction with the accompanying drawings.

BRIEF DESCRIPTION OF THE DRAWINGS

In the accompanying drawings:

FIGS. 4, 5, 7 and 8 are cross-sectional views showing an embodiment of rollers for switching the direction of a film negative, respectively;

FIG. 9 is a frontal view showing a mask in detail;

FIGS. 14A and 14B are views for explaining the correspondence between pixel segmentation of an original film and the memory data of an image data inspection device;

FIG. 15 is a view for explaining the relationship between the mask and a film negative;

FIGS. 16A and 16B are views showing discrimination between a full size frame and a half size frame;

FIGS. 18A and 18B are examples of images density data for a full size frame and a half size frame, respectively;

FIGS. 21A and 21B are views of a memory to show examples of image data;

FIGS. 22A and 22B are views showing the relationship between a film negative and image data;

FIGS. 25A, 25B and 26A through 26C are graphs and a figure respectively showing the state of edge detection;

FIGS. 29A and 29B are views of a memory respectively showing image data;

FIG. 35 is a view showing the state of detection of the perforations;

FIG. 36 is a view showing an example of reference sensitivity;

FIGS. 40A and 40B are views for explaining the correspondence between pixel segmentation of an original film and the memory data;

FIGS. 41A through 41D are views of a memory for explaining examples of image data;

FIG. 42 is a view showing the stage of the film negative carrier; and

DESCRIPTION OF THE PREFERRED EMBODIMENTS

Figure 1:
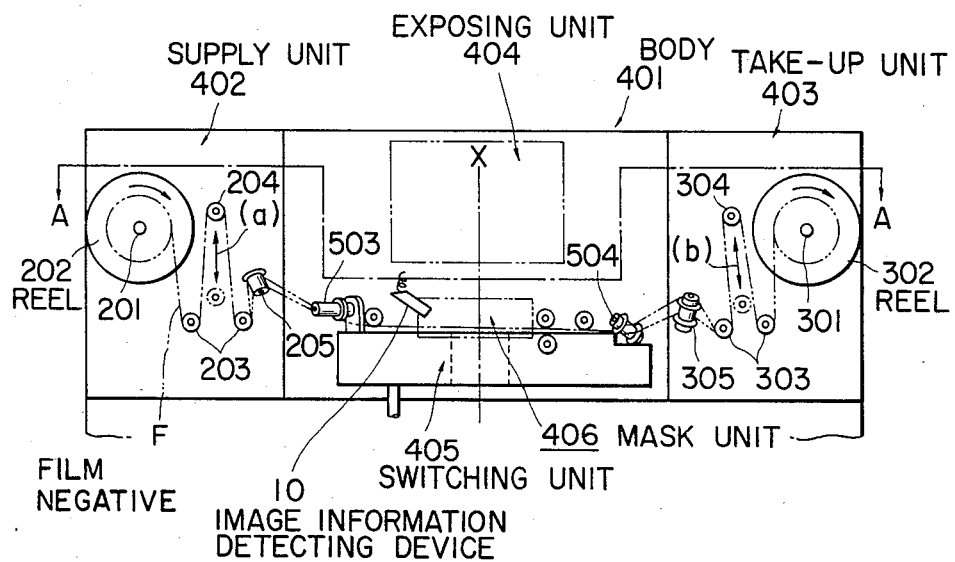
FIG. 1 is a frontal view showing an embodiment of a photographic printer according to this invention.
Figure 2:
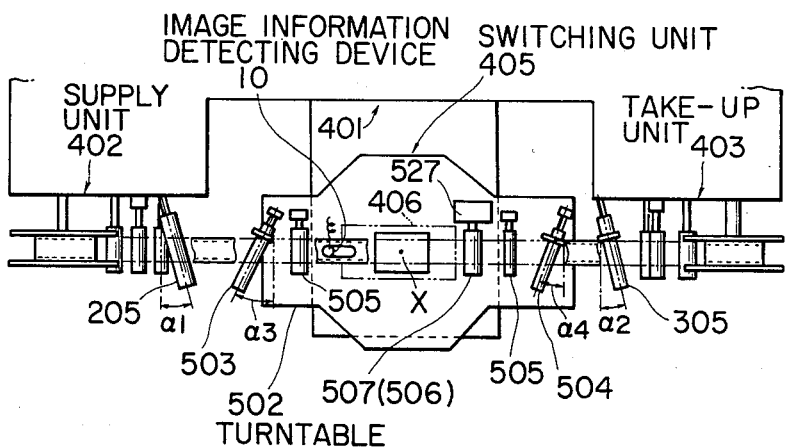
FIG. 2 is a cross-sectional view of FIG. 1 viewed from the direction of arrows A—A.

FIG. 1 shows an embodiment of this invention of a photographic printer in a frontal view which is capable of printing images of a full size frame and a half size frame on a roll of photographic paper in a substantially identical frame size and shape. FIG. 2 is a cross-section of FIG. 1 viewed from the arrows A-A to particularly show the conveying system when a full sized frame of a film negative is being printed.

In the figures, the reference numeral 401 denotes a body of the system; element 402 is a supply unit of a film negative, element 403 is a take-up unit; element 404 is an exposing unit; 405 is a switching unit for controlling the conveying direction of the film, and element 406 is a mask unit; the letter X denotes an optical axis, and element F is film negative. The photographic printer according to this invention is adapted to print images via the optical system thereof of a film negative F on a roll of photographic paper which is conveyed in the lower side of the body 401 of the system in a manner to be described hereinafter in parallel with and in the same direction as the frames of the film negative F at the time it is passing the optical axis X while the film negative F is being conveyed from the supply unit 402 to the take-up unit 403.

Figure 3:
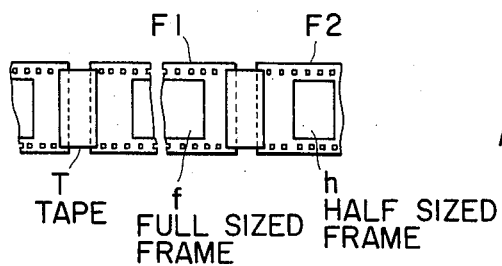
FIG. 3 is a plane view of a film negative to which this invention is applicable.

As shown in FIG. 3, the film negative F used in this photographic printer may be an elongated film comprising a film negative F1 having full sized frames f and a film negative F2 having half sized frames h, film negative F1 and F2 being connected by a piece of tape T. The supply unit 402 includes a feeder shaft 201 which is connected on one end thereof to a motor (not shown) (the motor rotates in normal and reverse directions to actuate a dancer roller 204 which is described hereinafter), a reel 202 which is attached to the feeder shaft 201 and is wound with a negative film F, guide rollers 203 which are mounted rotatably on supporting shafts fixed on the body 401, a dancer roller 204 which is energized by a spring (not shown) to move reciprocally in the direction (a) of FIG. 1 to control the feeding length of the film negative F, and a direction switching roller 205 (referred to as the first switching roller hereinafter) which changes the direction of the film negative F.

Figure 4:
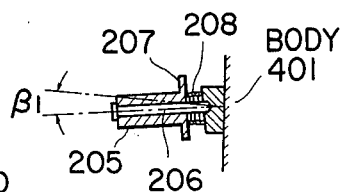

The film negative F is paid out of the reel 202, passes through a conveyor route comprising the guide rollers 203, the dancer roller 204, etc., and reaches the film negative direction switching unit 405. The first switching roller 205 is provided on the outlet side of the conveyor route and swings on a supporting shaft 206 which is fixed on the body 401 on one end thereof by an angle α1 in the conveying direction of the film when viewed from the horizontal plane as shown in FIG. 2 and an angle β1 downward as against the lower side when viewed from the right side of the body 401 as shown in FIG. 4. The switching roller 205 has a flange 207 close to the bottom thereof (or close to the side of the body 401) to positionally restrict the movement of the film negative F in the direction of its width. The switching roller 205 is energized with a spring 208 so as to slide along the supporting shaft 206. It is desirable that the first switching roller 205 is positioned to have the angles of swing or α1 and β1 so that both sides of a film become equal in length during the time it is fed out of the feeder reel until it reaches a printing mask at the mask unit 406 in relation to a third switching roller (which is to be described hereinafter). The angles will be described in more detail hereinafter.

The take-up unit 403 includes a reel-in shaft 301 which is connected on one end thereof to a motor (not shown) (the motor rotates in normal and reverse directions to actuate a dancer roller 304), a reel 302 which is mounted on the reel-in shaft 301 to reel in the film negative F after the printing operation, guide rollers 303 which are mounted rotatably on a supporting shaft fixed on the body 401, a dancer roller 304 which is energized with a spring (not shown) and moves reciprocally in the direction (b) of FIG. 1 to control the feeding length of the film negative F, and a conveying direction switching roller 305 (referred to as the second switching roller hereinafter).

Figure 5:
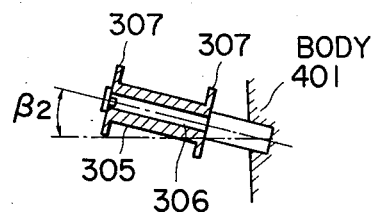

The film negative F passes through the group of rollers in the conveyor route comprising guide rollers 303, the dancer roller 304, etc. and is coiled on a reel 302. The second switching roller 305 is provided on the inlet side of the conveyor route of the unit, and swings on a supporting shaft 306 by an angle α2 in the conveying direction when viewed from the horizontal plane as shown in FIG. 2 and an angle β2 upward when viewed from the right side of the body 401 shown in FIG. 5. The supporting shaft 306 is fixed on one end thereof to the body 401. The switching roller 305 is provided with flanges 307 on both sides widthwise.

The exposing unit 404 is a section which expose the film negative F with light via a mask unit 406 (which will be described hereinafter). The film negative conveyor direction switching unit 405 is provided between the feeding unit 402 and the reel-in unit 403 to change the direction of the film negative F by 90° from the optical axis X and has the structure shown in FIG. 6. The switching unit 405 has an opening 501 provided on the optical axis X to correspond to a frame of the film negative F to be printed and includes a conveyor route which comprises a turntable 502 which is rotatable by 90° around the optical axis, a third switching roller 503 which is positioned above the upper surface of the turntable 502 on the inlet side of the opening 501, and a group of rollers of a press roller and a feed roller for guiding the film negative F to pass through the opening 501.

The turntable 502 is carried on slide balls 509 provided on the upper surface of a fixed table 508. The turntable 502 is adapted to rotate by 90° around the optical axis by moving and rolling the roller 511 along the guiding groove 510 cut on the fixed table 508 in an arc shape around the optical axis X. The fixed table 502 is driven to rotate by a motor 516 fixed to the body 401 via gears 512 through 515.

The gear 512 has an opening 517 at the center thereof and is fixed underneath the turntable 502 with the axis X at the center. Similarly, an opening is bored through the fixed table 508 with the axis X at the center so that the light emitted from the exposing unit 404 may be transmitted through the openings 501 and 517 downward.

The opening for printing formed on the turntable 502 along the conveying route of the film negative F is provided with an image information detecting device 10 (which is described hereinafter) for detecting the frame size of a film negative F or the direction. The images information detecting device 10 outputs driving signals to the motor 516 and the mask unit 406.

The third switching roller 503 is provided on the inlet side of the conveyor route of the opening 501 of the turntable 502 adjacent to the first switching roller 205. When the turntable 502 rotates, the switching roller 503 together with the roller 205 function to change the conveying direction of the film negative F by 90°. The switching roller 503 is rotatably mounted on a shaft 521 which is journalled on a fixed bearing 520 on the upper surface of the turntable 502, and swings by an angle of α3 in the direction opposite to the first switching roller 205 when viewed from the horizontal plane but stays substantially horizontal when viewed from the right side of the body as shown in FIG. 7. The third roller 503 has a flange 522 and a groove 523 for guiding the film negative F close to the bottom so as to make the film negative F gradually move toward the bottom of the shaft to be fit in the groove when the turntable 502 is being rotated. A fourth switching roller 504 is provided on the outlet side of the conveyor route of the opening 501 of the turntable 502 adjacent to the second switching roller 305, and has function together with the second roller 305 to change the direction of the film negative F by 90° when the turntable 502 rotates. The fourth switching roller 504 swings on a supporting shaft 525 which is journalled on a fixed bearing 524 on the surface of the turntable 502 by an angle α4 in the direction opposite to the second switching roller 305 when viewed from the horizontal plane as shown in FIG. 2, and by an angle β4 upward when viewed from the right side of the body as shown in FIG. 8 and has flanges 526 on the side widthwise. A feed roller 507 is connected to a pulse motor 527 which is driven synchronously with the motor for conveying a roll of photographic paper (not shown) and together with the press roller 506 conveys the film negative F in synchronism with the photographic paper.

As shown in FIG. 9, the mask unit 406 comprises a fixed piece 410 having an opening 410A which define the longer side of the mask for a full size frame and the shorter side of the mask for a half size frame, and a pair of sliding pieces 411 and 412 which move to approach to or away from each other to define opposing sides of a full size or a half size. A frame size of the film negative F to be printed is defined with an opening formed with the sides of the opening 410A of the fixed piece and sliding pieces 411 and 412. Ends of the sliding pieces 411 and 412 are attached with nut members 413 and 414, respectively. Members 415A and 415B of a screw rod 415 threaded in the pitch opposite to that of the nut members are screwed into the nut members 413, and 414 and the screw rod 415 is rotated in normal and reverse directions by a motor 417 via a gear box 416. When the motor 417 is driven to rotate in the direction N, the sliding members 411 and 412 slide in the directions N1 and N2 respectively due to the mating between the screw rod 415 and nut members 413 and 414 to thereby narrow the opening 410A. When the motor 417 is driven to rotate in the direction M, the sliding members 411 and 412 slide in the directions M1 and M2 respectively to expand the opening 410A.

The switching operation of the photographic printer with the above mentioned structure will be described below.

Figure 10:
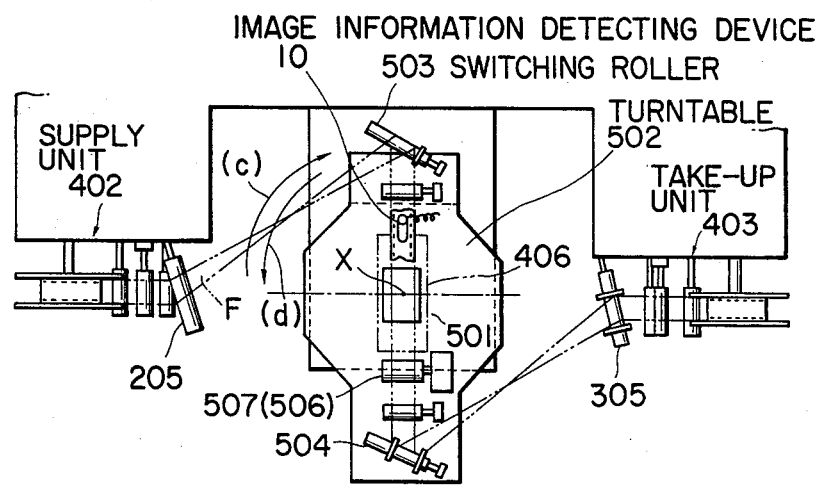
FIG. 10 is a plane view of this invention device when switched in direction.

When a film negative F is inspected and detected to have a half size frame by an image information detecting device 10 (in a manner which is described later), the motor 516 is actuated to rotate the turntable 502 in the direction (c) by 90° around the optical axis X from the state shown in FIG. 2 to the state shown in FIG. 10. An enlarging lens is switched to another lens suitable for enlarging/printing half size frames. When the turntable 502 rotates, as the distances between the switching rollers 205 and 503 and between the switching rollers 305 and 504 increase film respectively, the negative F is moved to be paid out of the reel 202 on the feeder side and to be reeled out from the reel 302 on the reel-in side. As the dancer rollers 204 and 304 are actuated, the feeder motor rotates in normal direction to feed out a predetermined length of the film negative F while the reel-in motor rotates in reverse direction to reel out a predetermined length of film negative F. As stated above, when the turntable 502 rotates, the film negative F on the feeder side is turned in a conveying direction by 90° from the position of the full size by the third switching roller 503 and conveyed to the opening 501. The film negative F after having passed through the opening 501 is turned by the fourth switching roller 504 and turned again by the second switching roller 305 before it is conveyed to the reel-in side. If the film negative F is changed in direction while being swung as mentioned above, the film negative F moves toward the inclined shafts of respective rollers. When the preset distance between switching rollers, for instance, the distance set between the first roller 205 and the third roller 503 is short, the shift toward axial direction may be intensified, but such excessive inclination is modified by a spring 208 provided on the first roller 205 in axial direction thereof in this invention system. As the film negative F at the third switching roller 503 is moved gradually toward an axial direction to ultimately fit in the groove 523 and be conveyed, it is not to be damaged during the time it is turned but conveyed smoothly.

The above statement concerns the switching from a full size to a half size. When the system is to be switched from a half size to a full size (or the case switching from the status show in FIG. 9 to FIG. 2), an operation converse to the operation noted above will take place.

In this photographic printer system, four switching rollers 205, 305, 503 and 504 are provided to change to the conveying direction of a film negative F. The angles of inclination of those rollers in the axial direction (the angle $\alpha 1 \ldots \alpha 4$ and $\beta 1 \ldots \beta 4$ of respective switching rollers) are set within the scope of 10 to 30 degree and are determined at a preferable value by the relative positional relationship among the rollers and the mechanical characteristics of the film negative F such as tensile strength (especially the positional relationship among rollers when the turntable 502 is turned). In the case where the distance between rollers can be sufficiently provided, the first switching roller 205 and the second switching roller 305 may be designed to have the same shape at the same inclination while the third roller and the fourth roller may be designed to have the same shape at the same inclination. In that case, the spring 208 otherwise attached at the first switching roller 205 and the groove 523 otherwise attached at the third switching roller 503 may be omitted to simplify the grooves of each roller. The above mentioned four rollers are the minimum and sufficient ones and the number thereof may be increased as the necessity arises.

Figure 6:
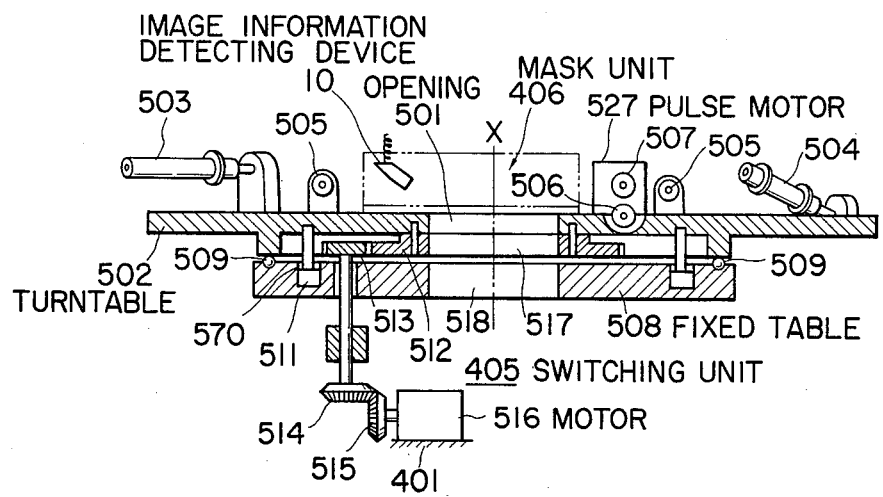
FIG. 6 is a front sectional view showing a direction switching unit in detail.
Figure 11:
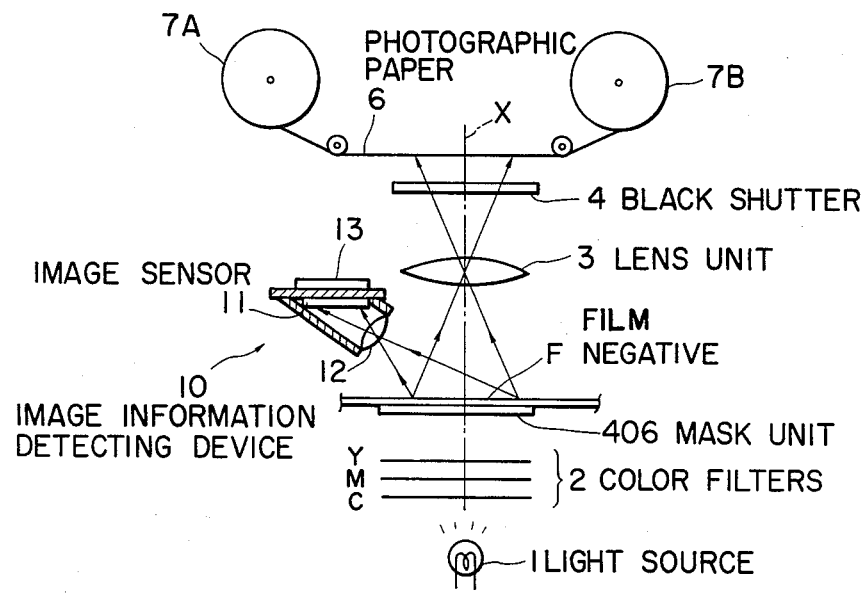
FIG. 11 is a structural view showing an embodiment of an optical system according to this invention.
Figure 12:
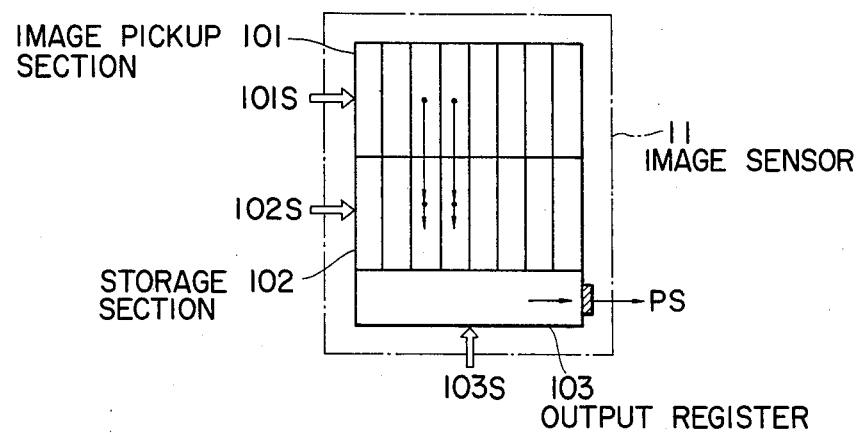
FIG. 12 is a structural view showing the function of a two-dimensional image sensor to be used in this invention.

In the aforementioned structure of this invention system, an image information detecting device 10 automatically detects the size of a film negative F and discriminates it into either a full size frame or a half size frame and supplies the result in driving signals to a motor 516 shown in FIG. 6 and a motor 417 shown in FIG. 9. FIG. 11 shows the optical system of an image information detecting device 10 mounted on a photographic printer wherein a negative film F, when it reaches the mask unit 406, is illuminated with light from a light source 1 via three primary color filters 2 of yellow (Y), magenta (M) and cyan (C). The light being transmitted through the negative film F reaches a photographic paper 6 at the exposing unit 404 via a lens unit 3 and a black shutter 4. Although the light passing through the film negative F is detected herein, the light reflected therefrom may be also detected. The photographic paper 6 is wound on a supply reel 7A and is undone in synchronism with the movement of the film negative F to be coiled on a take-up reel 7B. An image information detecting device 10 is provided close to the film negative F at an angle from the optical axis of the light source 1 and the film negative F to house a two-dimensional image sensor 11. A lens unit 12 is provided in front of the two-dimensional image sensor 11 to focus a substantially central portion of the film negative F. A substrate 13 made with ICs used to package processing circuits for image processing is mounted on the reverse surface of the device 10 in an assembled unit.

Figure 13:
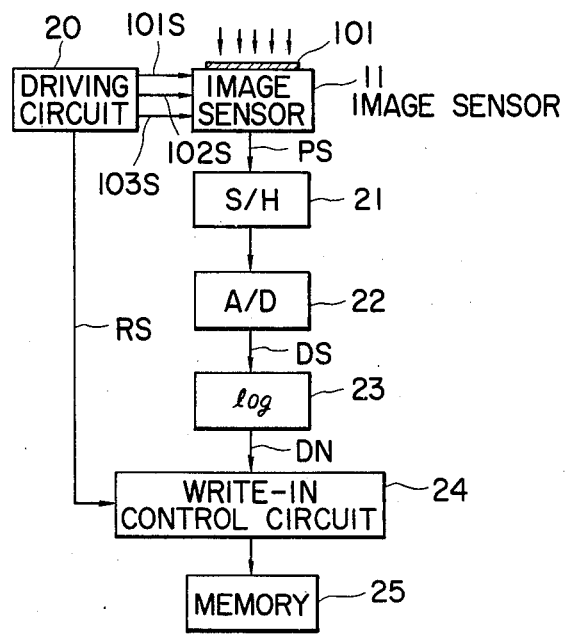
FIG. 13 is a block diagram showing the control system of the two-dimensional image sensor.

The two-dimensional image sensor 11 comprises an image pickup section 101 which optically picks up images, a storage section 102 which stores charges transferred from the image pickup section 101 and an output register 103 which outputs the charges accumulated at the storage section 102. The image sensor 11 photoelectrically converts image data of two dimensions (area) to analog image signals PS for serial output from the output register 103 by controlling driving signals 101S through 103S from a driving circuit. The circuit packaged on the substrate 13 may have the structure shown in FIG. 13 wherein the image sensor 11 is driven with driving signals 101S through 103S from the driving circuit 20, the light illuminated onto the image pickup section 101 from the image sensor 11 is outputted from the output register 103 as image signals PS, sampled and held by a sample-and-hold circuit 21 at a predetermined sampling cycle and the sampled values thereof are converted into digital signals DS by an A/D converter 22. The digital signals DS are inputted to a logarithmic converter 23 to be logarithmically converted into density signals DN and written in a memory 25 via a write-in control circuit 24. The write-in control circuit 24 has been inputted with a read speed signals RS from the driving circuit 20 for driving the image sensor 11 to read out image data at a preset speed and is adapted to write-in density signals DN sequentially at a predetermined address of the memory 25 in accordance with the driving speed of the image sensor 11.

In this invention system, one frame of the film negative F which has been conveyed to the mask unit 406 is segmented into a large number of pixel arrays for image detection. In other words, a predetermined driving signals 101S through 103S are given from the driving circuit 20 to the image sensor 11 so that the two-dimensional image sensor 11 is illuminated with the light which has transmitted through the film negative F on the mask unit 406 via the lens unit 12. The two-dimensional image sensor 11 can therefore scan the large number of segmented pixels in array sequentially along the scanning lines SL to ultimately scan the whole frame surface of the film negative F as shown in FIG. 14A. After scanning the whole surface, the image sensor 11 sequentially outputs image signals PS from the output register 103. The image signals PS are sampled and held by the sample-and-hold circuit 21 and the sampled values thereof are converted into digital signals DS by the A/D converter 22. The digital signals DS from the A/D converter 22 are logarithmically converted by the logarithmic converter 23 to become density signals DN. The density signals DN are controlled with a write-in control circuit 24 to be stored in the memory 25 in the array to correspond to the pixels FK shown in FIG. 14B and in the density digital values of the film negative F.

When the memory 25 has stored the digital values for each of the pixels of the film negative F of the density values DN in relation to the three primary colors R, G and B for each pixel by the aforementioned technique, it becomes possible to read out the digital values from the memory 25 for each of the pixels of the film negative F. If the density values for each of RGB or the three primary colors as shown in FIG. 14B is computed and stored, the values can be used for determining the exposure or correction for photographic printing just like in the prior art technique by reading out and processing the stored values in the necessary operations. An operational expression is determined in advance for each size of the film negative F. If it is assumed that the large area transmittance density (LATD) is Da, the maximum density Dmax, and the minimum density Dmin, the exposure $X_1$ of a 135 full size film can be expressed as $$X_1 = a_1 \cdot Da + b_1 \cdot Dmax + C_1 \cdot Dmin + D_1 \qquad (1)$$

while the exposure $X_2$ of a 135 half size film may be expressed as $$X_2 = a_2 \cdot Da + b_2 \cdot Dmax + C_2 \cdot Dmin + D_2 \qquad (2)$$

$$X_s = K_i + K_j X \qquad (3)$$

Expression (3) is a correctional expression $X_s$ and the images of the film negative F is printed with the amount of exposure $X_s$ which has been corrected.

A film negative F of elongated form is conveyed sequentially to the mask unit 406. This system is standardized to fit for the full size film and when a half size film is conveyed, the direction of conveyance is switched. This is because the number of full size film negatives is larger than that of half size film negatives in printing. At the normal state as shown in FIG. 15, the opening of the mask unit 406 is adjusted to correspond to the frame Fn of the full size film F so that the whole frame image in a full size frame can be detected by the image information detecting device 10. In other words, the height D1 of the fixed piece 410 at the mask unit 406 is used as the length of the shorter side of the frame while the distance D2 between the sliding pieces 411 and 412 of the mask unit 406 is made slightly longer than the longer side of the full size frame. If the opening of the mask unit 406 is adjusted sizewise like this, the image data of a full size frame become as shown in FIG. 16A when the film negative F is positioned at a location shown in FIG. 15, while that of a half size frame becomes as shown in FIG. 16B. This example shows detected data in anti-logarithmic form or in digital values of 8 bits (0 through 255). The area from which light is shuttered by the fixed piece 410 at the mask unit 406 is indicated with "0" and since image free areas without images between frames allow almost all light to transmit therethrough, the areas show values close to the maximum "255". Therefore, the frame imaged areas encircled with broken lines show values from "0" to "255". An image rarely shows the maximum or the minimum values regularly and continuously. A size of a frame can be discriminated by comparing the values on the vertical lines L1 and L2 (a total value) of the two-dimensional image sensor 11 with a reference value in the case of a full size film negative, and by comparing the values of the vertical lines L1, L2 and L3 of a half size frame film with a reference value. If a predetermined area on the lines L1, L2 and L3 of the two-dimensional image sensor 11 are set in advance, and when a film negative F is passed through above (or underneath) the mask unit 406, if the values at lines L1 and L2 coincide with the reference values preset for a full size frame, the size of the film negative F is judged as a full size frame film and, if it coincides with the reference value preset for the half size value, the film negative F is judged as a half size frame film. In other words, when a film negative is conveyed over the mask unit 406, the state shown in either FIG. 16A or 16B always appears, from which the size of the film can be discriminated. In case the size cannot be discriminated with the first one or two frames (for half size), several frames could be conveyed and digital values for several frames may be read out for discrimination. The size may be also discriminated by setting the distance D2 between the sliding pieces 411 and 412 of the mask unit 406 as the length equivalent to several frames in full size and reading out image data for the several frames.

A frame size can be therefore discriminated from the whole image data read out by the image sensor 11. The frame data of the frame size of the film negative F thus read out is fed to the motors 516 and 417 to automatically determine the direction of conveyance of the negative film F as well as to select the optimal operational expression for determining the exposure so that a computation can be effected for printing.

Figure 17:
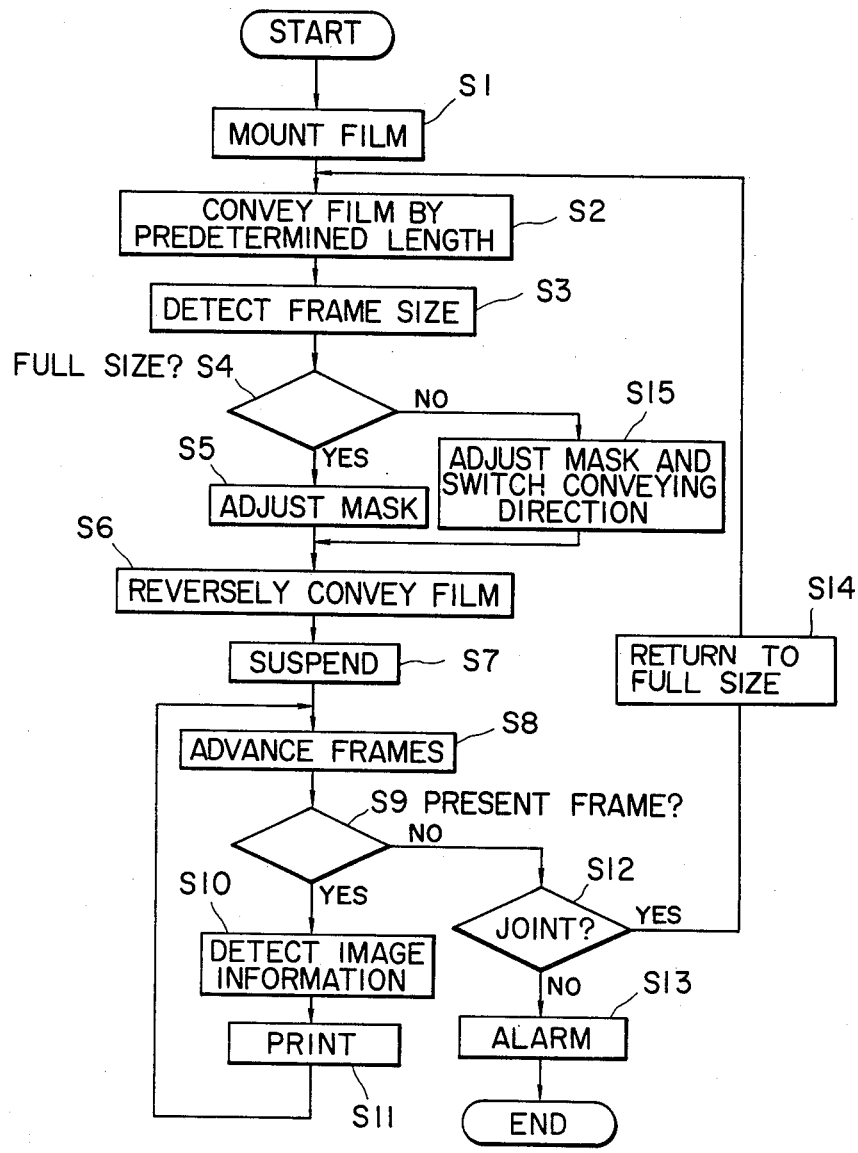
FIG. 17 is a flowchart showing an example of operation of this invention.

The printing operation of the aforementioned photographic printer is now explained referring to the flowchart of FIG. 17.

A film negative F is mounted at a predetermined position on a printer (Step S1), the film negative F is conveyed by a predetermined length (for instance, the length to allow the first frame to pass through the mask unit 406) (Step S2). Since a frame image of the film negative F always passes through the mask unit 406, the image data of either FIG. 16A or 16B is detected by the image information detecting device 10, which in turn discriminates a full or a half size frame size (Step S3). If the film negative F is conveyed excessively and the first frame has gone beyond the mask, the film negative F may be re-wound by a preset length by driving the motor reversely. If the detection reveals the film negative F as a full sized film, the distance D2 between the sliding pieces 411 and 412 of the mask unit 406 which has been set in the state shown in FIG. 15 is adjusted to be the longer side of the full size frame (Steps S4 and S5). If the result of the detection reveals the size as a half size, the distance D2 between the sliding pieces 411 and 412 is adjusted to be the shorter side of a half size frame and at the same time, driving signals are fed to the motor 516 so as to switch the conveying direction (Steps S4 and S15). The distance D2 may be adjusted by sending driving signals to the motor 417. In this manner, the size of the film negative F is detected, and when adjustment is completed for each frame size, the film negative F is conveyed reversely, if necessary, and suspended (Steps S8 and S7). Frames are advanced in a manner disclosed by Japanese Patent Application No. 54018/1984 (Step S8), to judge the presence/absence of a frame or to judge the printability of images (Step S9). If there are imaged frames, frame image data of a printable frame is detected by the image information detecting device 10 by the aforementioned technique (Step S10), exposure is determined, printing is conducted and the step is returned to the above Step S8 (Step S11). If there is no frame present at the above mentioned Step S9, whether or not there is a joint connection between films should be judged (Step S12). If there is no joint, this means there is no film negative to print, the operation should end by sounding an alarm (Step S13). If a joint is detected, as the next film comes to be printed, the direction of the film conveyance is rotated by 90° by the switching unit 405 to return to the original state, thereby restoring the distance D2 between the sliding pieces 411 and 412 to the original length of FIG. 15

(Step S14). The presence of a joint may be detected by the image information detecting device 10 from the area of predetermined width which block light.

Although in the above embodiment the two-dimensional image sensor 11 is provided at an angle from the optical axis of the film negative F and the light source 1, the light passing through the film negative F may be reflected on a half mirror provided in front of the lens unit 3, and the reflected light may be fed to the image sensor 11. In this case, the light passing through the half mirror is irradiated upon the photographic paper 6 via the lens unit 3.

Although the image information is detected by the image information detecting device 10 from the light passing through the film negative F as noted above, it may be detected from the light reflected on the film negative F. In the foregoing description, an elongated piece of film comprising both full-sized film negatives and half-sized film negatives may be printed, but it is possible to automatically print a film negative comprising full-sized frames alone and a film negative comprising half-sized frames alone. In the case of printing a piece of film negative which generally comprises six frames for re-printing, the film may be conveyed by means of a double roller type film negative carrier provided with feed rollers before and after the mask unit 406.

In the case of a photographic printer using a manual carrier, when a half-size frame film is to be printed, an operator manually changes the film negative carrier to the one suitable for half-sized frame films and turns the apparatus by 90° in order to use a roll of paper of the same size as the full size. The data detected from the in-between areas without images of the film negative is represented in logarithmically converted density in FIG. 18A for a full size and in FIG. 18B for a half size. The size of a film may be discriminated by detecting the density "0" from the image information read out by the image sensor and computing the area thereof. This enables detecting the state where half-sized frames are being conveyed in the vertical direction (turned by 90°). When receiving such information, it is possible to automatically select a print channel having the printing reference condition for the half-size. In the embodiment, a two-dimensional image sensor is used, but image information may be detected by a one-dimensional image sensor disclosed in Japanese Patent Application No. 7533/1984.

As described in detail in the foregoing, this invention is advantageous in that the direction of conveying of a film negative is automatically switched by detecting image information not only on original films but also on peripheral areas and discriminating a full size frame from a half size frame from the density values of a large number of pixels obtained by segmenting a film frame. The invention is desirable in that it does not require pre-processing steps such as providing a notch on a film or preparing paper tape data corresponding to the film negative, and the packing operation for film negatives and printed pictures can be conducted continuously irrespective of the size so as to reduce the post-processing steps. Since the photographic printer according to this invention does not need a notch detector nor a film connection detector, the structure of a film negative carrier can be simplified. This invention enables a reduction of the printing steps and to save manpower in the operation.

If combined with a film negative correction operation, this printer can stably produce prints of high quality irrespective of the skill of the operators. The photographic printer according to this invention can also prevent loss of paper which might otherwise be caused by erroneous replacement of paper (when a full size direction should be switched to a half size direction) or by operational errors (such as in lens replacement and in print channel switching).

Figure 19:
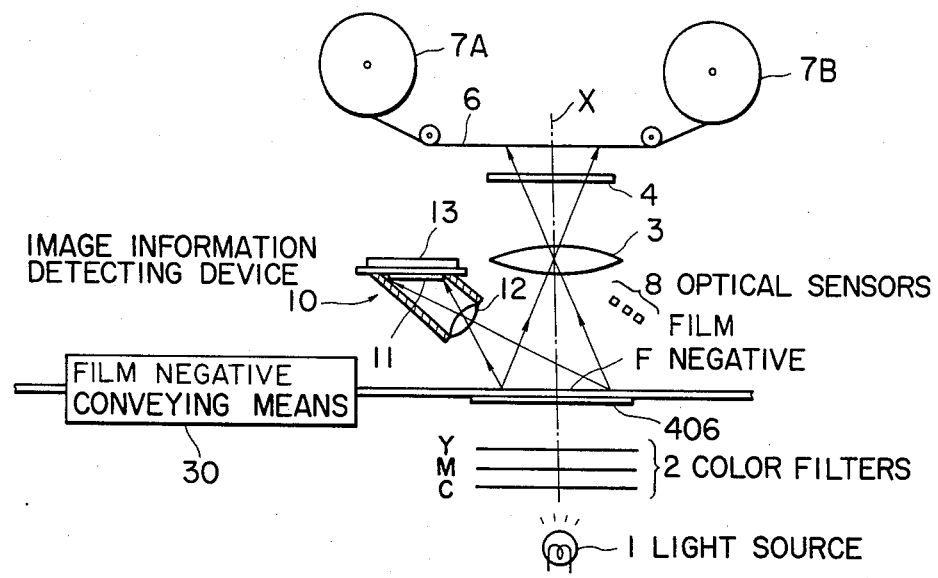
FIG. 19 is a structural view showing an embodiment of this invention when applied for a photographic printing system.

FIG. 19 shows an example of application of the aforementioned image information detecting device 10 according to this invention for a prior art photographic printer in comparison with the one shown in FIG. 11. In the figure, a film negative F which has been conveyed to the mask unit 406 by a film negative conveying means 30 is illuminated by the light from a light source 1 via three primary color filters of yellow (Y), magenta (M) and cyan (C). The light passing through the film negative F reaches a photographic paper 6 via a lens unit 3 and a black shutter 4. Optical sensors 8 such as photodiodes are provided near the lens unit 3 of the film negative F to detect the image density data of three primary colors of red (R), green (G) and blue (B). With the detected signals from the optical sensors 8, images are printed. An image information detecting device 10 is provided near the film negative F at an angle from the optical axis X of the light source 1 and the film negative F to house a two-dimensional image sensor 11. In front of the image sensor 11 is provided a lens unit 12 to substantially focus the central portion of the film negative F. A substrate 13, used to package processing circuits comprising ICs, is mounted on the reverse surface of the detector module.

Conventional photographic printing is conducted in this structure by the steps of conveying a film negative F and positioning it at the printing portion, detecting the light passing through the film negative F with the optical sensors 8 and adjusting the color filters 2 in accordance with the image signals for each of the three primary colors, RGB, and opening the black shutter 4 and exposing the images on the photographic paper 6 with a predetermined amount of light.

Figure 20A:
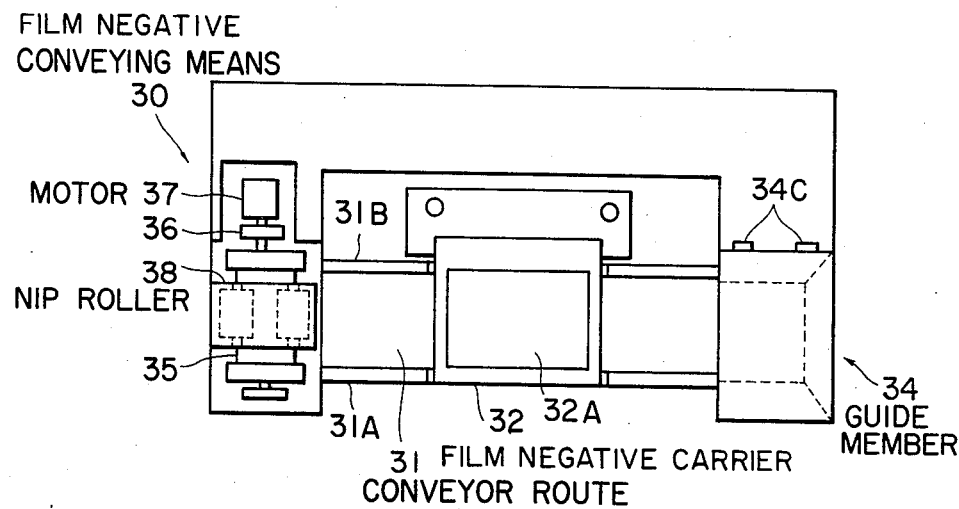
FIG. 20A is a plane view showing the structure of a printing section in detail.
Figure 20B:
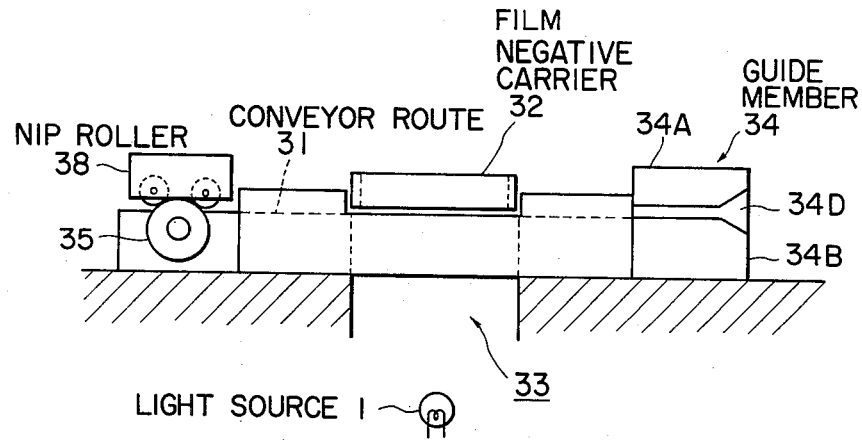
FIG. 20B is a side view thereof.

In this invention, an image information detecting device housing a two-dimensional image sensor 11 of area-scanning type comprising CCDs is provided near the film negative F and a whole area of a frame of the film negative F is segmented into a large number of pixels in array for image information detection. An elongated film negative F is conveyed sequentially to the mask unit 406 of the printing potion with a film negative conveying means 30. As shown in FIGS. 20A and 20B, the conveying means 30 is adapted to mount a film negative carrier 32 (mask unit 406) having a rectangular opening 32A of a size corresponding to the size of a film negative at the center of the film negative conveyor route 31. The film negative is to be conveyed between the negative film conveyor route 31 and the film negative carrier 32. Guiding walls 31A and 31B are erected from both sides of the film negative conveyor route 31 to direct the film negative F. A through hole 33 is bored immediately below the film negative carrier 32 to receive the light from the light source 1. At the inlet of the conveyor route 31 is provided a guide member 34 comprising an upper plate 34A and a bottom plate 34B for holding a film negative therebetween for smooth introduction. The upper plate 34A can be opened/closed by hinges 34C. At the outlet of the conveyor route 31 is provided a film negative driving roller 35 which mounts and winds the film after it has been printed and conveyed thereto. The driving roller 35 is driven by a motor 37 via a reduction mechanism 36. A nip roller 38 comprising a pair of rollers is provided above the driving roller 35 to smoothly conduct the mounting and winding of the film negative F. The nip roller 38 is also opened upward by a hinge member (not shown).

A film negative to be printed is introduced from the opening 34C of the guide member 34, conveyed on the conveyor route 31 to pass under the film negative carrier 32, reaches the end of the conveyor route 31, and ultimately mounted on and wound by the driving roller 35 via a nip roller 38. The film negative carrier 32 may be changed to accommodate the size of a particular film negative. The opening 32A of the film negative carrier 32 corresponds the size of frames of the film so that the image free peripheral areas surrounding a frame would not extend beyond the edges of the opening 32A of the film negative carrier 32. Therefore, the area from which the two-dimensional image sensor 11 receives light is not limited to the size of an imaged frame but also includes the areas of the film negative carrier 32 which do not transmit light so as to be large enough to generously cover a large sized film. The image information of the area which is detected by the two-dimensional image sensor 11 may become, for instance, the image information of 110 size film negative carrier shown in FIG. 21A or the image information of 135 full size film negative carrier shown in FIG. 21B. FIGS. 21A and 21B show examples of image information detected from the areas of the film having no picked up images or examples where there is no film negative. The area encircled with broken lines at the center represents the opening 32A. Since the size of the opening 32A corresponds to the size of the film negative F, the area of the opening 32A can be obtained by detecting the density "0" (or a value close thereto) which indicates the absence of picked up images from the data on the opening read out by the image sensor 11, and computing the area thereof, to thereby ultimately discriminate the size of the film negative F. Since the optical axis of the image sensor 11 is substantially directed to the center of the opening 32A, and the surface of the image sensor 11 is arranged in parallel to the film negative F, the size of the film negative F can be discriminated by computing either in software or hardware the number of pixels having the density "0" and comparing the values with reference values which are respectively determined for each size in advance. In the case where a one-dimensional image sensor is used, the size can be discriminated in a similar manner since the number of pixels having the density "0" on one vertical column at the center of FIG. 21 corresponds to the film negative. The operation is applicable to 135 half size, too, where a film negative is turned by 90° from the position of 135 full size so as to match the direction and size in lateral and vertical directions for printing.

The size of a film negative is detected as described in the foregoing by computing the number of pixels to detect the areas having the density "0" which indicates the size of the opening 32A of the film negative carrier 32 from the whole image data read out by the image sensor 11. For instance, if the number of pixels having the density "0" is "24" as shown in FIG. 21A (it may be 20 to 28 to have an ample margin), the size would be judged to be 110-size while when the number of the pixels is "96" as shown in FIG. 21B, the size would be judged to be 135 full size (it may be 82 to 110 similarly). The size data on the film negative F thus discriminated is transferred to the printing system to be printed in accordance with the size thereof after selecting an appropriate exposure determining expression or computing the exposure with a predetermined operational expression. The size data on the film E may be inputted visually by an operator.

When a film negative is conveyed to the printing unit for printing, it is necessary to accurately position image frames 2A, 2B, 2C . . . on a film negative carrier 32 as shown in FIG. 22A. After being printed, the imaged frame is conveyed further to accurately position the next frame of the film negative. In the prior art, the film negative is given a notch by an auto notcher for automatically positioning the frame at a predetermined position. This invention enables accurate positioning of image frames since it can detect from the image information not only image frames 2A, 2B, 2C . . . but can also detect image free areas RA, RB, RC . . . between adjacent frames from the density data thereof if the image data for each pixel of the image sensor 11 is to be detected as shown in FIG. 22B for the film negative F of FIG. 22A. However, if all the detected data is to be used for positioning imaged frames, it would take lots of time. If the speed of operation must be enhanced, the capacity of the micro-computer must be increased, entailing a higher cost of the system. If data is detected from the whole surface of the image sensor 11, accurate data cannot be detected on the periphery thereof due to the optical aberration of the lenses. In order to obviate such prior art defects, the linear portion 40 orthogonally intersecting the direction of film negative conveyance at the center of the two-dimensional image sensor 11 is electrically extracted, as shown in FIG. 14A, and edges of the film negative F are detected from the linear portion 40. If it lies at the central area, image data on the same line can be selected and processed even at the time of switching between different frame sizes. If the peripheral area is detected in the frame of 135 full size, an eclipse would be caused in a small sized film negative such as 110 film. A two-dimensional image sensor is not necessarily required for discrimination of the film size in edge detection of negative F. Such an operation may be conducted by one-dimensional image sensors arrayed in line or a single or plural photodiode arrays arranged in a in line.

Figure 23:
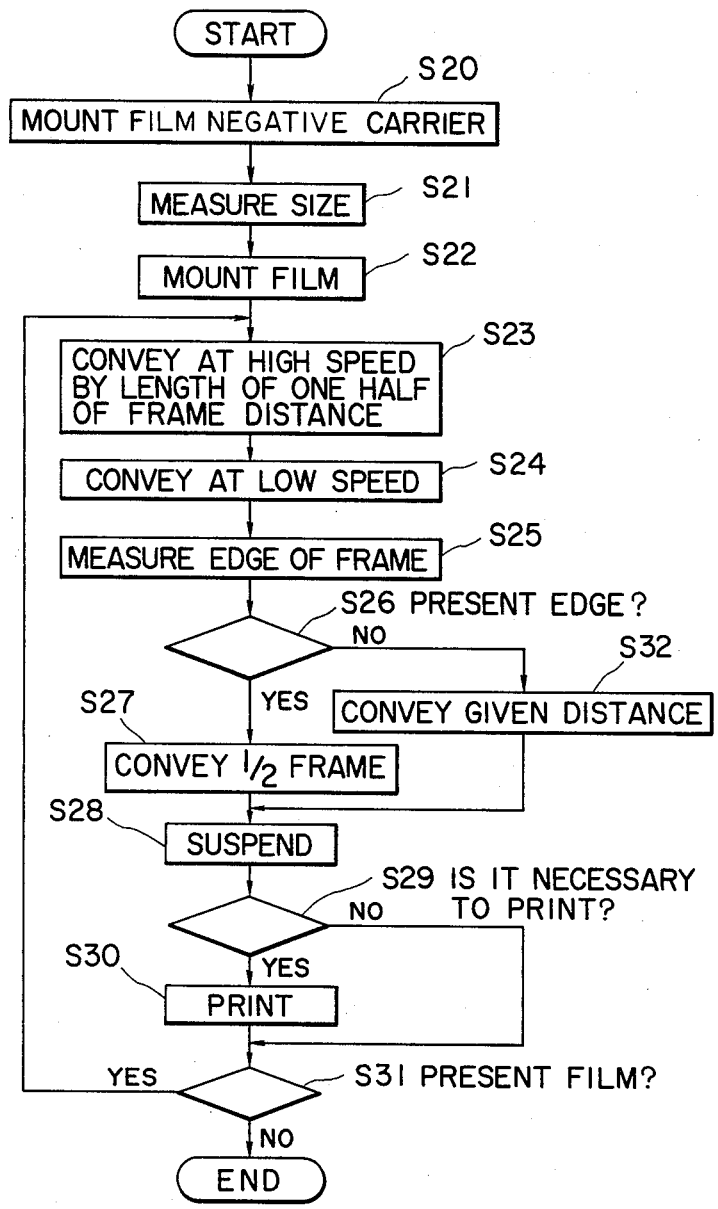
FIG. 23 is a flowchart showing an example of operation according to this invention.

FIG. 23 is a flowchart of the method according to this invention for detecting and positioning frames; wherein a film negative carrier 32 of a size corresponding to the size of a film negative which is to be printed is mounted at a predetermined position at the printing unit (Step S20); and the size of the opening 32A of the film negative carrier 32 is measured with the image sensor 11 in the aforementioned method (Step S21). The size may be measured visually and the result may be inputted. In accordance with the measured size, the feed of the film negative F, printing exposure and correction thereof are controlled.

Figure 24:
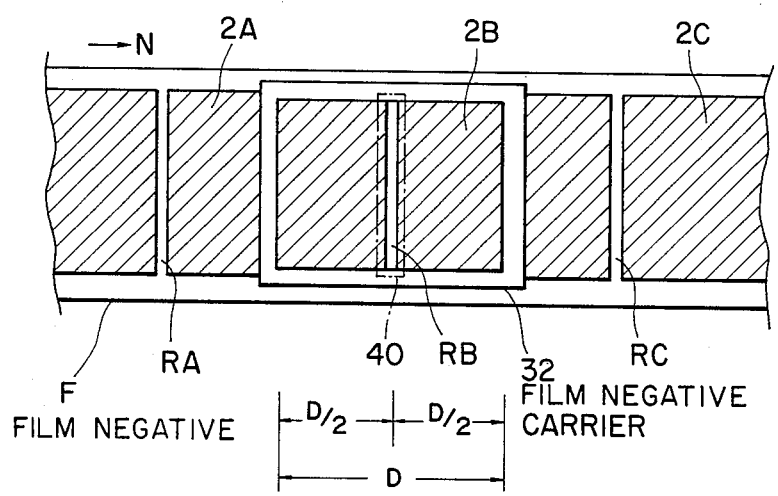
FIG. 24 is a view showing a film negative carrier.

The film negative F is mounted in a manner to align an image free frame at the tip of the film substantially at a position corresponding to the opening 32A of the film negative carrier 32 (Step S22); as the end of the film negative F is mounted on a film negative driving roller 35, the motor 37 is actuated to advance at a high speed the film negative F by the length of one half of the distance D between frames or D/2 (Step S23); micro-adjustment is conducted at a lower speed (Step S24);

and in the meanwhile, image data is detected by the image sensor 11 to obtain the data for each pixel shown in FIG. 22A. As is obvious from the corresponding relationship shown in FIGS. 22A and 22B, there generally exists conspicuous differences in density values between the imaged frames 2A, 2B, 2C . . . and image free portions between frames RA, RB, RC . . . ; if the image sensor 11 detects in the linear portion 40 thereof an area whose density value is below a given value, and which shows a steep change in density value in the lateral direction while the change in the vertical direction remains in a given scope (the vertical direction means the direction perpendicular to the advancing direction of the film negative), then the area represents the edge RA of the frame 2A, or likewise edge RB of the frame 2B, or the edge RC of the frame 2C. FIG. 24 shows such detection method wherein a film negative F is conveyed in the direction N on the printing portion of the film negative carrier 32 so that the edge RB is detected at the linear portion 40 of the image information detecting device 10. The linear portion 40 is always aligned to come to the center of the film negative carrier 32. For facilitating understanding, the width of an edge is depicted as being large in FIGS. 24 and 22B, but the actual dimension of edges on the film negative is around 1 mm which is detectable by a sensor not having a very high resolution. In the case where the edges are detected by a sensor having a low resolution, since the density changes slowly and gradually from the image free portion toward the imaged frames, the film negative may be conveyed at a fine pitch such as about 0.1 mm, and the time of inversion or the time where the change becomes zero is recognized as an edge by detecting data such as the time series changes at the line portion 40 of the sensor or the relative difference or the relative ratio between two lines.

Figure 26A:
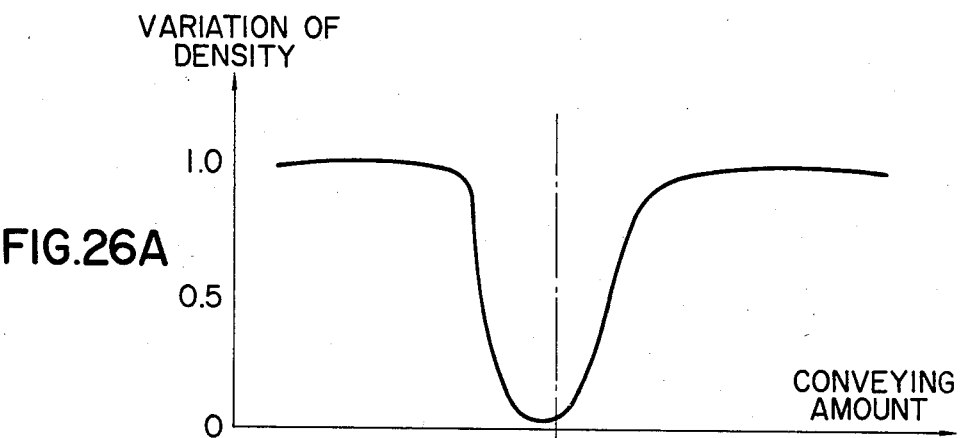
Figure 26B:
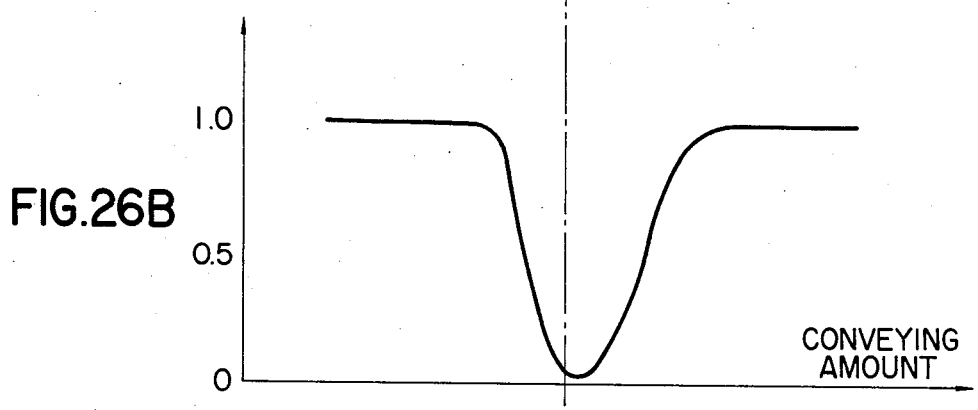
Figure 26C:
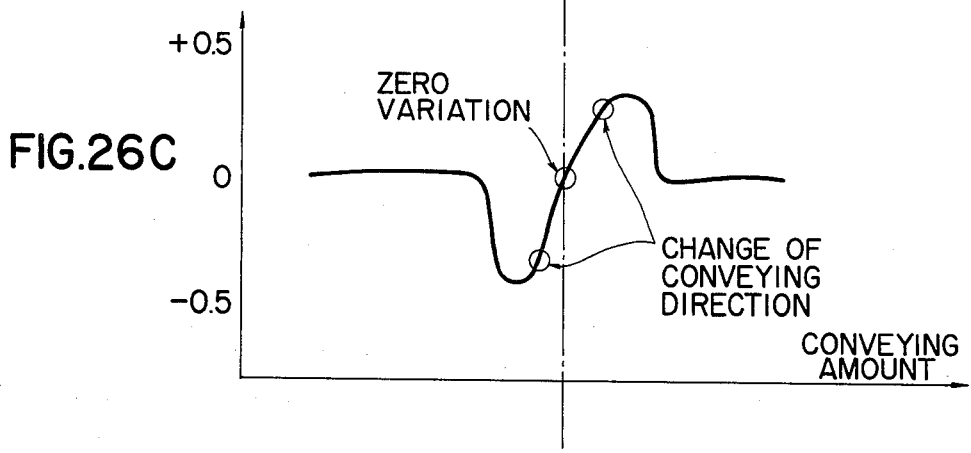

FIGS. 25A, 25B and 26A through 26C show the detection of edges. More particularly, in FIGS. 25A and 25B, as the film negative is moved at a fine pitch as shown in FIG. 25B, the variation in time at one line portion 40 of the image sensor 11 (or the variation in density) becomes as shown in FIG. 25A, thereby enabling one to detect the position where such a variation becomes zero as an edge. In FIGS. 26A through 26C, on the other hand, one line of the image sensor outputs at two different positions are represented by FIGS. 26A and 26B. An edge can be detected by obtaining the position where the difference between the two values in FIG. 26C becomes zero.

Until the time such an edge is detected, the film negative F is continuously advanced at a low speed (Step S24); and if an edge RB is detected, with the size data which is obtained by the above mentioned size measurement (Step S21), the frame in question is conveyed by the distance D/2 to position the frame at the printing portion (Steps S25, S26 and S27) and the file negative is suspended there (Step S28). The distance (D/2) from the edge of the image frame positioned at the center of the file negative carrier 32 to the printing portion for the frame can be obtained by computation once the size of the frame is known. Therefore, the file negative F can be suspended accurately at the optimal position at the printing portion by advancing the film by the distance D/2 from the position shown in FIG. 24. As the first frame of the file negative F is often confused with an image free frame, the first frame may be positioned manually. In that case, the procedure begins from the Step S28 after the Step S22 of the flowchart in FIG. 23.

If no edge is detected at the linear portion 40 of the detecting device 10 even if the file negative F is slightly conveyed by a given fine distance, the film negative may be advanced by the distance F or the interval distance between frames (Step S32).

After having advanced and positioned the film negative, the file negative F is judged to determine whether or not it is to be printed (Step S29), if it is not necessary to print, the procedure jumps to the Step S31, and if it is necessary to print, the film negative is printed at a determined exposure and correction (Step S30). In order to advance and print the next frame at the printing portion, the presence/absence of the film negative F is determined and with the size data abtained at the above Step S21, the file negative F is conveyed at a high speed by the distance slightly less than one half of the interval between frames (Steps S31 and S23). The presence/absence of a file negative can be detected since all the image data for the opening 32A becomes "0" as shown in FIGS. 21A and 21B when the film negative F has gone out of the file negative carrier 32. The printability of a suspended frame can be detected if all the image data of FIG. 14B is above a given value (corresponds to a film negative with excessive over-exposure) or below a given value (corresponds to a film negative with excessive under-exposure) or remains within a given scope (corresponds to a film negative of excessively low contrast). Each of the image frames can be printed consecutively and automatically by repeating the aforementioned operations of conveying and positioning. When there is no more film at the Step S31, rotation of the film negative driving roller 35 is automatically suspended and the operation is completed. An alarm may be sounded to notify the operator of the end of the film processing operation. The above description has been made in terms of density values, but it is obvious that it may be conducted in terms of anti-logarithmic data by omitting the logarithmic converter 23. The above description was given presupposing that the detection is conducted at the center of an original film which is positioned at the center of a film negative carrier, but the detection may be conducted at portions close to the center.

As described in the foregoing, this invention enables photographic processing at higher efficiency and precision since the image data including original images and surrounding areas is detected by an image sensor to know the size and at the same time an edge is detected at the center of a film negative carrier to thereby autmatically detect and position an image frame at predetermined position.

Figure 27:
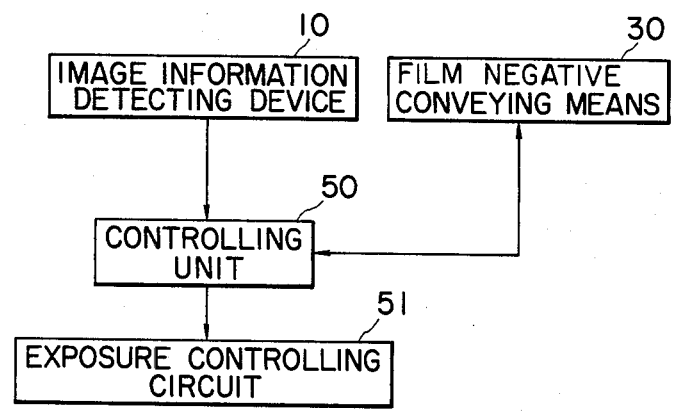
FIG. 27 is a block diagram showing the control system of the whole device according to this invention.

FIG. 27 shows the controlling system of the whole system wherein the image information detecting device 10 and the conveying means 30 are adapted to be controlled by controlling unit 50 comprising a micro-computer, etc. The controlling unit 50 computes an exposure in accordance with an operational expression with the information detected by the image information detecting device 10, and inputs the exposure at the exposure conptrolling circuit 51. The exposure control circuit 51 controls the color compensation amount of the filters 2 in accordance with the input exposure, the amount of light at the light source 1 and the black shutter 4 to expose frame images of the film negative F onto the photographic paper 6.

Figure 28:
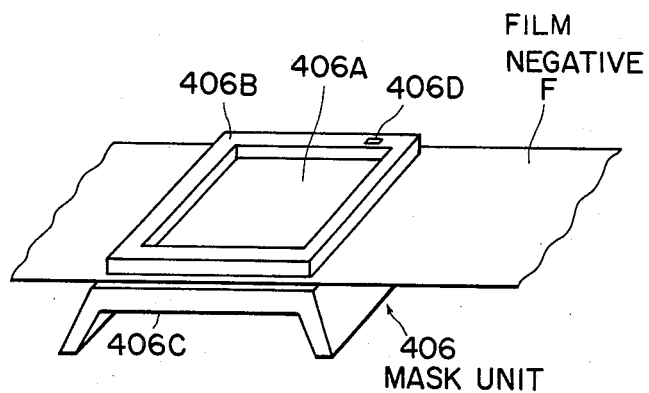
FIG. 28 is a view showing the details of the printing unit.

A series of film negative or a piece of frame (for instance in the unit of six frames) may be automatically and sequentially conveyed to the printing portion and mounted thereon via a controlling unit 50 or may be mounted on the unit manually piece by piece as shown in FIG. 28. At the printing portion or the mask unit 406, an upper guide 406B in a rectangular shape having an opening 406A is engaged with a lower guide 406C provided below to hold the film negative F therebetween so that the film negative F may be printed frame by frame. The size of the opening 406A completely corresponds to the size of a frame of the film negative F so that image free areas surrounding a frame never extend beyond edges of the opening 406A. The area of the two-dimensional image sensor 11 which receives light not only includes imaged frames of the film negative F but also includes the area on the upper guide 406B which does not transmit light in order to cover larger sized film negative. The image information of the area detected by the two-dimensional image sensor 11 becomes as shown in FIG. 29A in the case of 110 size film negative carrier and becomes as shown in FIG. 29B in the case of 135 size film negative carrier. FIGS. 29A and 29B show examples of the image data detected when there is no film negative F wherein areas encircled with broken lines represent openings 406A respectively or the areas having image frames. Since the size of an image frame corresponds to the size of the film negative F, the area of the opening 406A can be detected by detecting the density "0" which indicates the area is not imaged out of the image information read out by the image information detecting device 10, and obtaining the number thereof, to ultimately descriminate the size of the film negative F through automatic processing. Since the optical axis of the image sensor 11 is substantially directed toward the center of the opening 406A, the size of the film negative F can be discriminated by computing the number of pixels having the density "0" (or values around "0") either by hardware or software, and comparing the computed value with values predetermined for each size in advance.

Figure 30:
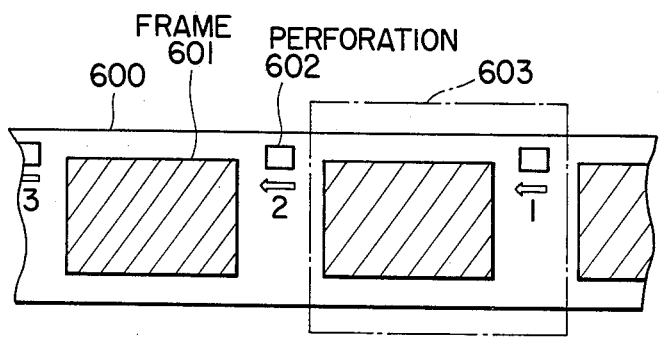
FIGS. 30 through 32 are views showing the relationship between imaged frames and perforations.
Figure 31:
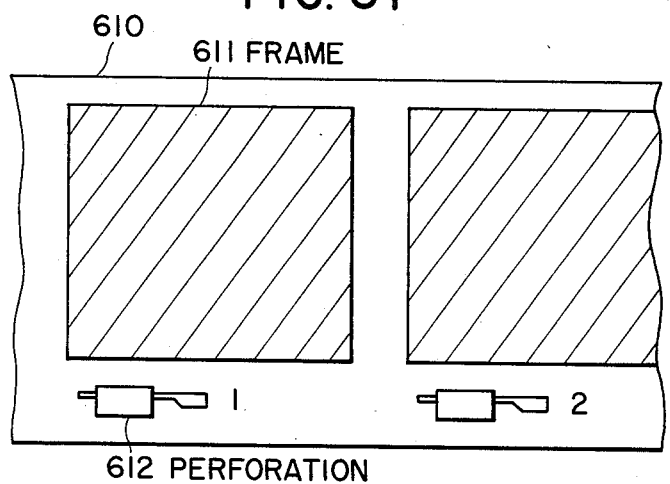
Figure 32:
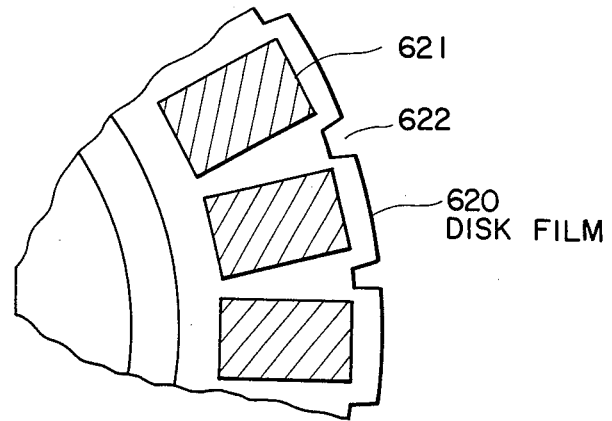
Figure 33:
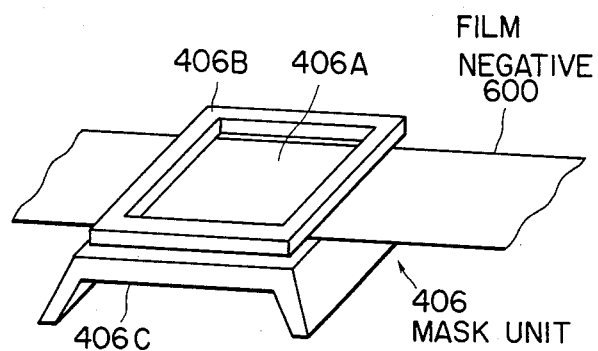
FIGS. 33 and 34 are views for explaining the structure of a film negative carrier.

In the case of the film 600 of 110-size as shown in FIG. 30, the positional ratio of imaged frames with respect to perforations is 1:1. Therefore imaged frames 601 can be detected by detecting corresponding perforations 602. As shown in FIG. 31, in the case of the film negative 610 of the 126-size, the ratio of imaged frames 611 with respect to perforations is 1:1 positionwise, and that of the imaged frame 620 with respect to perforations 622 in the disc film 620 is 1:1 positionwise. According to this invention, all of the film negative having the abovenoted positional relationship of imaged frames may be controlled by detecting perforations with the image sensor 11, and using the amount of conveyance determined by the above mentioned size data. More particularly, the position of perforations always has a constant relationship with the position of imaged frames and perforations are holes of a given size which permit transmission of light. Therefore, perforations can easily be detected by the difference from the mask density of the film negative 600, in a fashion similar to the detection of the size of the imaged frames. Simply by positioning the perforations at predetermined positions, it becomes possible to convey an imaged frame by a rate suitable to the film size and position the same accurately at the position for the mask unit 406.

In the photometry mentioned above, the two-dimensional image sensor 11 should optically receive image information in the area 603 for a 110-size film 600, for instance. For this purpose, the dimension of the upper guide 406B of the film negative carrier is determined to be large enough to extend over both sides of the film 600. The size of a film negative carrier which is larger than that of a film negative 600 permits the two-dimensional image sensor to detect not only frames of the film negative 600 but also perforations thereof as well as the information recorded near the perforations 602. In case the width of an upper guide of a film negative carrier is made larger than that of the film negative 600, the information can still be read out but the information of the areas other than frame images 601 is also detected by the detecting device 10 for the exposure of frame images 601 mentioned above. This problem can be solved by selecting the image information of the areas encircled by broken lines at the centers in FIGS. 29A and 29B in accordance with the size. The size can be detected in the aforementioned manner.

Figure 34:
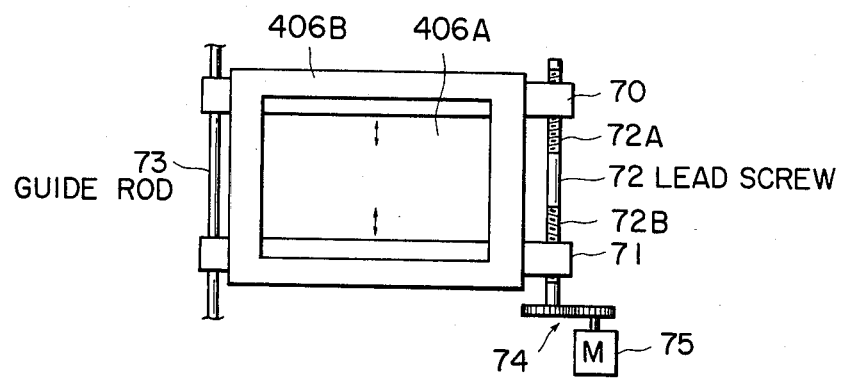

Holes may be bored of a size substantially the same as that of perforations in the portions of the upper guide 406B and the lower guide 406C which do not transmit light at positions corresponding to the frame images 601 in order to detect perforations. The light scattered from the perforations 602 may reach the photographic paper 6 as flare at the time of printing to affect the quality of photography. Such undesirable influences of flares can be mitigated either by providing holes for perforation detection at positions which deviate from the position of the opening 406A and conveying the frame at a given rate after detection of perforations to finally position it, or by providing a partial ND (neutral density) filter having suitable values. It is also possible to switch the size of the opening 406A at the mask unit 406 with the signal from the mask unit 406 as shown in FIG. 34. In other words, guide plates 70 and 71 are provided in a manner to permit vertical movement between the upper guide 406B and the lower guide 406C as shown in FIG. 34, and the guide plates 70 and 71 are mated with a lead screw 72 on one side and engaged with a guide rod 73 on the other end. If the guide plates 70 and 71 are threaded with pitches 72A and 72B which are opposite to each other, and the lead screw 72 is rotated in one direction with a motor 75 via gears 74, the guide plates 70 and 71 can be moved in the opposite direction. By rotating the motor 75 in the normal direction, the opening 406A can be expanded but by rotating the motor reversely, the size of the opening 406A can be narrowed. Such a mechanism can easily be formed by a shutter system with solenoid drive. If such a driving mechanism is used in detection ot the information of the areas surrounding frame images of the film negative, detection of image information and printing of the frame images 601 on the photographic paper 6 can be conducted upon one single film negative carrier without undesirable influences of flares by enlarging the opening 406A to the area 603 shown in FIG. 30 and then narrowing it to the position shown in FIG. 28. The same process can be applied to a 126-size film negative 601 and a disc film 620, too.

FIG. 35 shows the correspondence of the data array in the memory of the two-dimensional image sensor 11 with the one shown in FIG. 30, wherein the density of perforations 602 is "0" since they are holes to permit the transmission of light. Since they are supposed to be detected continuously in a given number within a given scope of areas of each film size, perforations 602 can be electrically detected and discriminated with the image sensor 11 (an area 604 encircled by dot-and-dash lines in FIG. 35). The information on imaged frames 601 are stored near the perforations 602 (an area 605 encircled by dot-and-dash lines in FIG. 35). By reading out the data for each pixel which has been detected by the image sensor 11 by a CPU for discrimination, the perforations 602 provided on the film negative 600 can be detected and with the detection together with the aforementioned size data, conveyance and positioning of imaged frames can be precisely controlled. Although image information is described in terms of density values, it may be detected in terms of antilogarithmic values and the logarithmic converter may be omitted.

The reference position of reference sensitivity of perforations (an area 604 encircled by dot-and-dash lines in FIG. 36) may be set as initial values by automatically reading out and storing then together with imaged frame information by the image sensor 11 at the time of discriminating the size of the film negative F when there is no film mounted if a hole 406D for perforation detection is provided on the upper guide 406B in FIG. 28. They may be utilized as detection reference information for perforation detecion. In other words, the perforations can be accurately detected when the dot-and-dash area 604 in FIG. 35 shows the same pixel data as the one shown in the dot-and-dash area 604 in FIG. 36. The description was given in the foregoing for films which have the positional relationship between imaged frames and perforations of 1:1 and of which kinds are DISC, 110- or 126-size; the same is applicable to the films of 135-size which are provided with notches on image frames at the ratio of 1:1 in advance. Marks other than perforations or notches can also be detected for positioning so long as they positionally correspond to imaged frames. Although the aforementioned description is given with a photographic printer, this invention method may be applicable to the recording on such medium as magnetic tapes, optical discs, magnetic disc films, etc.

As is described in the foregoing, as this invention method can detect perforations and notches having a positional relationship with frames imaged at 1:1 as well as framed images and surrounding areas in segmented pixels of a large number with an image sensor in a non-contacting manner for determination of printing exposure and correction as well as for control in conveyance and positioning, imaged frames can be detected and positioned at a low cost and with a simple construction without the necessity of adjustment of the detectors in sensitivity and position nor the necessity of additional detectors for different film negative sizes.

Figure 37:
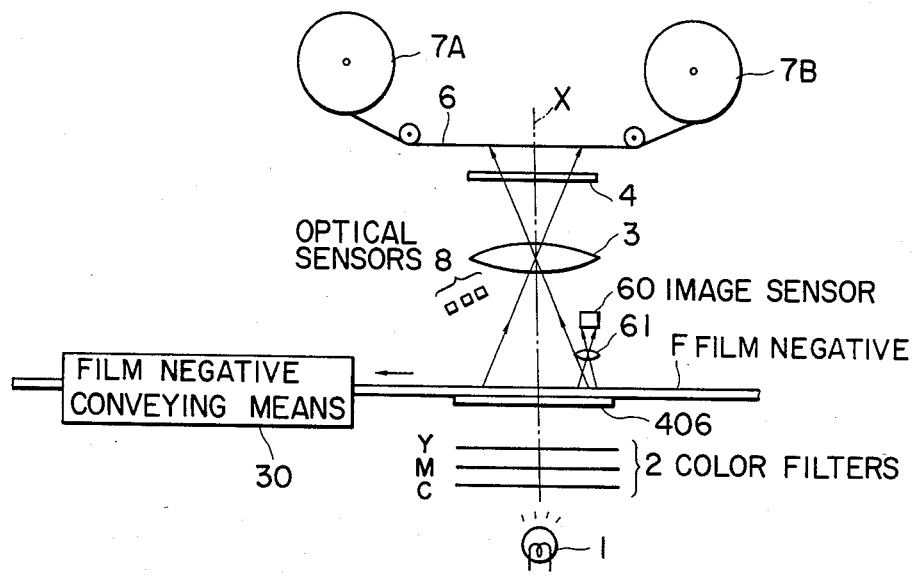
FIG. 37 is a structural view showing an embodiment of this invention when applied in a photographic printing system.
Figure 38:
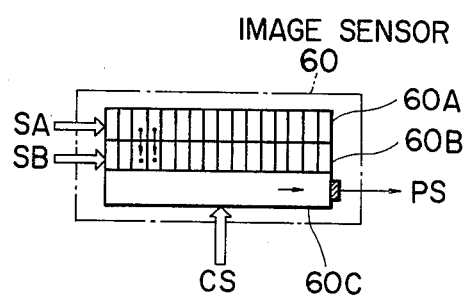
FIG. 38 is a structural view showing the function of a one-dimensional image sensor.

FIG. 37 shows and embodiment of one-dimensional image sensor (or line sensor) 60 and a lens unit 61 which are applied for a prior art photographic printer in correspondence with FIG. 19. In the figure, a film negative F is conveyed to the mask unit 406 by a conveying means 30 and illuminated with the light from a light source 1 via three complementary color filters of yellow (Y), magenta (M) and cyan (C), and the light transmitted through the film negative F impinges on a photographic paper 6 via a lens unit 3 and a black shutter 4. The one-dimensional image sensor 60 is provided on one side of the opening of a film negative carrier at a position perpendicular to the direction of the film negative conveyance so as to be able to scan the whole area of an original frame of the film negative F which is mounted on the film negative carrier. The image sensor 60 detects image information in a linear portion 41 on one end thereof as shown in FIG. 42. A lens unit 61 is provided in front of the one-dimensional image sensor 60 to focus and image the images of the film negative F.

Figure 39:
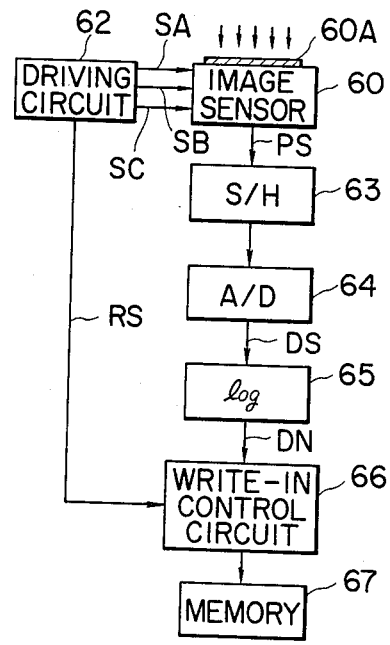
FIG. 39 is a block diagram showing the control system of the one-dimensional image sensor.

The one-dimensional image sensor 60 may be an MOS (metal oxide semiconductor) or a CCD and may comprise, in the case of a CCD, an image pickup section 60A which optically picks up images, a storage section 60B which holds charges transferred from the image pickup section 60A, and an output register 60C which outputs the charges held by the storage section 60B. It is adapted to photoelectrically convert one-dimensional image data to analog image signals PS by controlling driving signals SA through SC from a driving circuit and outputting the image signals PS serially from the output register 60C. The circuit may be constructed as shown in FIG. 39 wherein the one-dimensional image sensor 60 is driven with the driving signals SA through SC from the driving circuit 62, the light impinging upon the pickup section 60A of the sensor 60 is outputted from the image output register 60C as image signals PS to be held by a sample and hold circuit 63 at a given sampling cycle, and the sampled values are converted into digital signals DS by an A/D converter 64. The digital signals DS from the A/D converter 64 are inputted to a logarithmic converter 65 to be logarithmically converted into density signals DN to be written-in a memory 67 via a write-in control circuit 66.

According to this invention, the one-dimensional image sensor 60 comprising a CCD, for instance, is provided near the film negative F so that a portion or the whole area of a frame of the film negative F is segmented into plural pixels and the image information thereof is detected. More particularly, by feeding given driving signals SA through SC from the driving circuit 62 to the one-dimensional image sensor 60, the image sensor 60 can receive the light passing through the film negative F provided on one side of the printing section via the lens unit 61. This makes the one-dimensional image sensor 60 to divide the whole film negative F, for instance, the one shown in FIG. 40A, into arrays of small pixels FK of a large number so as to scan them sequentially along the scanning lines SL following numbers. It outputs image signals PS sequentially for each scanning of one line from the output register 60C. The image signals PS are converted into analog values and into logarithms and finally obtained as density signals DN which are stored in the memory 67 in terms of density digital values in arrays corresponding to the pixels FK shown in FIG. 40B.

Once digital values of density values in three primary colors for each pixel of the film negative F are stored in the memory 57, it becomes possible to read out necessary digital values for each pixel from the memory 67. Therefore, if the density values for each of the three primary colors are obtained and stored as shown in FIG. 40B by means of stripe filters (not shown) closely placed in correspondence with pixels of one-dimensional image sensor 60, the prior art printing exposure or correction can be determined therefrom by reading out stored values and processing them.

The film negative F in an elongated form is sequentially conveyed to the mask unit 406 with a conveying means 30 such as the one shown in FIGS. 20A or 20B.

As the size of the opening 32A of the film negative carrier is made to correspond to the size of a frame of the film negative F, the areas without images surrounding the imaged frame never exceed beyond the edges of the opening 32A. The area of the image sensor 60 which receives light is dimensioned large enough to not only include framed images of the film negative F but also to accommodate larger sized film negatives or the area on the film negative carrier which do not transmit light. The image information on the area without images which is detected by the one-dimensional image sensor 60 becomes that shown in FIG. 41A of the case of 110 size film negative carrier or that shown in FIG. 41B of the case of 135 size film negative carrier. The image information of 110 size of the one-dimensional image sensor similarly becomes that shown in FIG. 41C or that shown in FIG. 41D of the 135 full size. FIGS. 41A, 41B, 41C and 41D show examples of detected image data when no film is mounted wherein central areas encircled by broken lines denote openings respectively.

Since the size of the opening corresponds to the size of a film negative F, the size of a film negative F can be discriminated by detecting the density "0" which represents an area without images out of the data on the opening which is read out by the one- and two-dimensional image sensors by scanning, obtaining the number thereof and computing the area of the opening. More specifically, the size of a film negative can be discriminated by computing the number of pixels having the density "0" by hardware or software, and comparing the values with the values predetermined for each size. This invention system also can extract pixel lines in either a single or plural number out of the opening area encircled by broken lines automatically on one side. This makes adjustment in mechanical position of the sensor unit almost unnecessary. The size data of the film negative F thus obtained is fed to the printing system to conduct printing process in accordance with the size of the particular film F after computation or selection of the exposure according to a predetermined operational expression. The size data on the film negative F may be visually inputted by an operator.

When film negative F is conveyed to the mask unit 406 or printing portion, it is necessary to precisely position imaged frames 2A, 2B, 2C . . . on the film negative carrier as shown in FIG. 22A, and one frame after printing should be conveyed so as to accurately position the next frame. In the prior art, the film negative is provided with notches with an auto-notcher for positioning frames of the film at a predetermined position. For the type of film negative such as the one shown in FIG. 22A, the image information for each pixel of the one-dimensional image sensor 60 may be detected as the film F is being conveyed as shown in FIG. 22B so as to detect imaged frames 2A, 2B, 2C . . . from the image information as well as areas without images between frames RA, RB, RC . . . to thereby effect the positioning of imaged frames. The one-dimensional image sensor 60 is fixed with the lens unit 61 and the film negative F is conveyed by a conveying means 30 so that necessary areas of the film are selected and extracted for scanning. If all of the detected data should be used for detection and positioning of imaged frames, however, it would take a large amount of time for processing and if such processing should be conducted at a high speed, the microcomputers must be increased in speed, inevitably pushing up the cost of the system.

In order to avoid such inconvenience in this system a one-dimensional image sensor 60 is adapted to measure in photometry and compute the linear portion 41 which is perpendicular to the advancing direction of the film negative F at one side of the film negative carrier to detect an edge between imaged frames.

Figure 43:
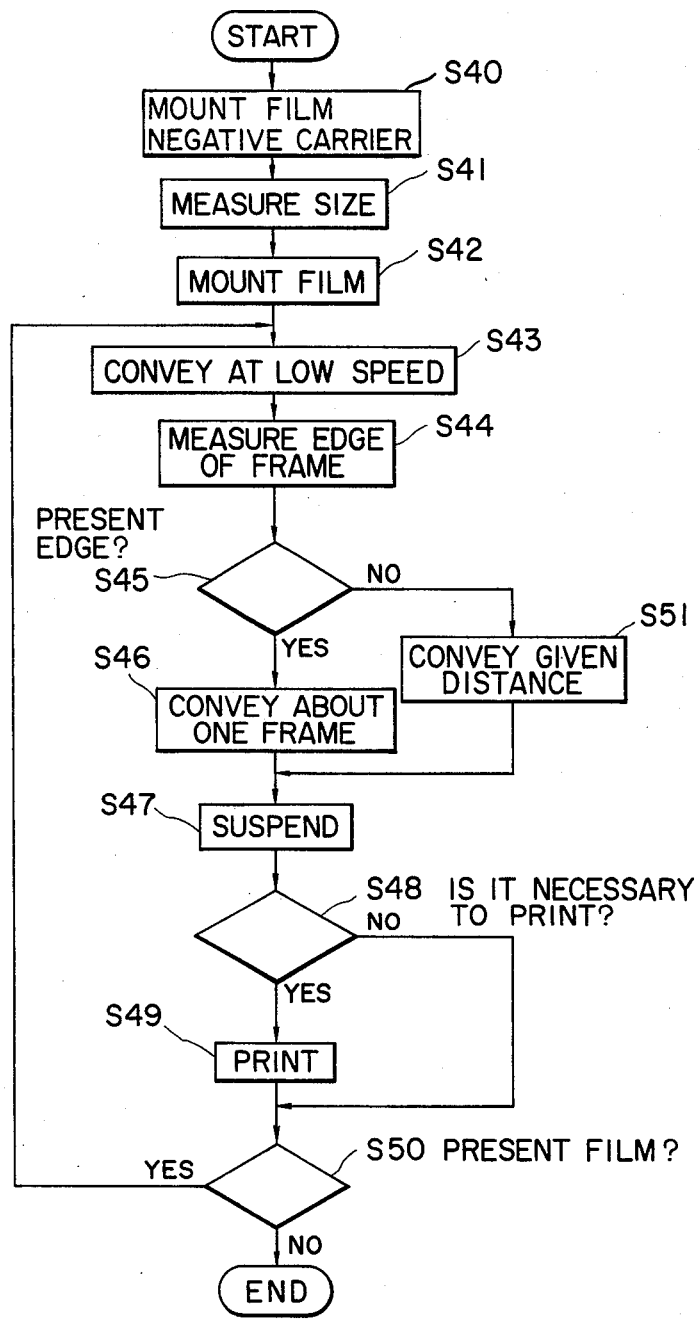
FIG. 43 is flowchart showing examples of operation according to this invention.

FIG. 43 is a flowchart to show this invention method for detecting and positioning frames of a film comprising the steps; the film negative carrier of the size suitable for the size of the film negative F which is to be printed is mounted at a given position at the mask unit 406 (Step S40); the size of the opening 32A of the film negative carrier is measured with the image sensor 60 by the above mentioned method (Step S41); a frame without images on the end of the film negative F in an elongated form which has been developed is mounted at a position substantially corresponding to the opening of the film negative carrier (Step S42); and the end portion of the film negative film F is mounted on the roller 35, and the motor 37 is actuated to slighty advance the film negative F by several fractions of the interval distance D between frames (Step S43). In the meanwhile, the image information is detected by the image sensor 60 to obtain the data for each pixel as shown in FIG. 22B. As is obvious from the corresponding relationship between FIGS. 22A and 22B, there is distinctive difference in density between the imaged frames 2A, 2B, 2C . . . and the areas between frames RA, RB, RC . . . , and edges RA, RB, RC between frames can be detected by detecting on the linear area with the image sensor 60 areas of which density value is less than a given value and which shows steep changes in density in a lateral direction while a change within a given scope in vertical direction (the direction perpendicular to the conveying direction for the film F). FIG. 42 shows such condition wherein a film negative F is conveyed in the direction N over the film negative carrier at the mask unit 406, and the linear posrtion 41 is adapted to come at one one side of the opening of the film negative carrier. In the figure, the edge RC is about to be detected on the linear portion 41 with the image sensor 60. For convenience's sake, in FIGS. 42 and 22B, the width of an edge is depicted larger than actual size, but in practice the width can be about 1 mm and detectable with a sensor not having a high resolution. If a sensor having a low resolution is used for the detection of edges, since the areas without images do not change so steeply in density from imaged frame areas, but change gradually, the edges are detected by conveying the film F at a low speed and at a micro-pitch such as about 0.1 mm, and detecting the time when the change becomes zero or the direction of change is inverted out of the time change of pixel data for one line of the sensor or a relative difference or a relative ratio between pixel data of two lines.

Until the time such an edge is detected, the film negative F is kept advancing at a low speed (Step S44); and when the edge RC is detected, the film F is conveyed at a high speed by the distance S which is needed to position the particular frame at a given position of the printing portion from the size data obtained by the above mentioned measurement (Steps S45, S46); and the frame is positioned (Step S47). The distance D between the edge (E) between imaged frames positioned on one side of the film negative carrier and the mask unit 406 of the particular frame can be obtained by the expression, $D = E + S$, if the size S is known. by advancing the film F by the distance D from the position of FIG. 42, the film F is precisely positioned at the mask unit 406. In case no edges are detected on the linear portion 41 of the one-dimensional image sensor 60, the film F is conveyed by a given length, for instance, by the distance D for convenience's sake (Step S51).

After such conveying and positioning operation of the film negative F, whether or not the particular frame which has been positioned or is suitable for printing is judged (Step S48). If it is found unsuitable, the procedure jumps to the Step S50. But when judged suitable, the particular frame of the film F is printed with the exposure and correction which are determined in advance (Step S49); and then whether or not the next frame of the film exists is judged after printing the first frame in order to convey and print the second frame at the mask unit 406, and the film is conveyed slightly in accordance with the size data obtained at the Step S41 (Steps S50, S43). The presence/absence of the film F can be detected simply because if there is no film negative F present on the film negative carrier, all the image information on the opening 32A as shown in FIGS. 41A, 41B, 41C and 41D become "0". Whether or not a particular frame which has been positioned at the unit is printable can be judged by detecting if all the image data of FIG. 40B are more than a given value (indicating an excessively over-exposed film) or if they all are less than a given value (indicating an excessively under exposed film) or if they remain within a given scope of values (indicating an excessively low contrast film).

By repeating the conveying and positioning operation as mentioned above, frames can be sequentially and automatically printed. When there exists no more film F at the Step S50, rotation of the roller 35 is suspended to complete the process. An alarm may be sounded to let the operator know the end of the process.

In the foregoing explanation, a one-dimensional image sensor is provided one one side of the film negative carrier opening, and edges between imaged frames or image data are detected on the linear portion with an ordinary spherical lens or non-spherical lens or other reducing optical systems. However, they may be detected by an optical system having no magnification difference such as lens arrays. The whole area including the periphery of the film negative carrier opening may be optically measured with a two-dimensional image sensor while edges between imaged frames are detected on a single or plural extracted portion (S) which are corresponding to the one side of the carrier. The description in the foregoing is given to an elongated film negative, but this invention is applicable to shorter film negatives (for instance, of six frames) if the film negative driving rollers 35 are provided on both sides of the opening 32A.

As is described in the foregoing, this invention can be detect image data on the areas including those surrounding imaged frames with an image sensor, and to control exposure by selection and extraction of necessary areas of an original film through scanning in synchronism with the conveyance of a film negative as well as to detect edges between images frames of the film at one side of the opening of the film negative carrier to automatically detect an imaged frame and position the same at a given position to thereby conduct photographic processing at a higher efficiency and precision and yet with a simpler construction.

It should be understood that many modifications and adaptations of the invention will become apparent to those skilled in the art and it is intended to encompass such obvious modifications and changes in the scope of the claims appended hereto.

What is claimed is:

1. A method for detecting and positioning imaged frames comprising steps of: receiving, with a two-dimensional image sensor, light from a film negative carrier which has been illuminated by a light source, the film negative carrier having an original film disposed therein; detecting light which has either passed through or been reflected from the original film on a linear portion of the two-dimensional image sensor at the center thereof, the linear portion being perpendicular to a conveying direction of the original film, so as to thereby detect edges of the original film; and, simultaneous to the edges of the original film being detected, advancing the original film in the conveying direction by a distance equivalent to one half of an interval between frames of the original film in correspondence with the size of the original film.

2. A method for detecting and positioning imaged frames as claimed in claim 1, wherein the size of the original film is manually inputted prior to the step of advancing the original film.

3. A method for detecting and positioning imaged frames as claimed in claim 1, wherein the size of the original film is detected by the image sensor and automatically inputted prior to the step of advancing the original film.

4. A method for detecting and positioning imaged frames as claimed in claim 1, wherein the original film is advanced in the conveying direction by a given length if an edge thereof is not detected.

5. A method for detecting and positioning imaged frames as claimed in claim 1, wherein the advancing of the film in the conveying direction and the positioning thereof is repeated until the time there exists no more original in the film negative carrier.

6. A method for detecting and positioning imaged frames comprising the steps of: receiving, with a one-dimensional image sensor, light from a negative film carrier illuminated by a light source, the light being either transmitted through or reflected from an original film being detected by the one-dimensional image sensor provided at a position at the center of the original film, the sensor being perpendicular to a conveying direction of the original film, so as to thereby detect edges of the original film; and advancing the original film in the conveying direction by substantially one half of an interval distance between adjacent frames contained in the original film in correspondence with the size of the original film.

7. A method for detecting and positioning imaged frame comprising the steps of: receiving, with an image sensor, light from areas on an original film including a periphery of imaged frames thereon, image data on the entire areas from which the image sensor receives light being detected for each pixel segment of a frame; and controlling the conveyance of the original film using detected data on the areas surrounding imaged frames, the detected data being stored in advance and corresponding to the positional relationship with respect to the imaged frames so as to thereby detect and position the imaged frames.

8. A method for detecting and positioning imaged frames as claimed in claim 7, wherein detecting the data on the periphery of an imaged frame comprises detecting perforations on the original film.

9. A method for detecting and positioning imaged frames comprising the steps of: optically measuring, with an image sensor, an original film having a positional relationship of imaged frames of the original film with respect to perforations or notches at 1:1 ratio; and controlling the conveyance of the original film based upon the detection of the perforations or notches so as to thereby detect and position the imaged frames.

10. A method for detecting and positioning imaged frames comprising the steps of: detecting, with an image sensor, light from areas on an original film including the periphery of imaged frames thereof; storing, in advance, reference data which is optically measured under a standard condition; detecting and storing image data which is optically received by the image sensor, and then, based upon the data obtained by comparing the data detected from the periphery of the imaged frames with the reference data stored in advance, controlling the conveyance of the original film so as to thereby detect and position the imaged frames.

11. A method for detecting and positioning imaged frames comprising the steps of: receiving, with a one-dimensional image sensor, light from one side of a negative carrier opening which has been illuminated by a light source, the light either passing through or being reflected from an original film contained within the negative carrier being detected on a linear pixel portion of the sensor, the linear portion being perpendicular to the conveying direction of the original film, so as to detect an edge between adjacent frames of the original film; conveying the original film by a distance equivalent to an interval distance between adjacent frames which corresponds to the size of the original film when an edge thereof is detected so as to thereby detect and position the image frames.

12. A method for detecting and positioning imaged frames as claimed in claim 11, wherein the original film is conveyed slowly at a minute pitch while the edge between the imaged frames is being detected, and at a higher speed after the edge has been detected.

13. A method for detecting and positioning imaged frames as claimed in claim 11, wherein the one-dimensional image sensor is moved relative to the original film so as to thereby detect image data on the original film.

14. A method for detecting and positioning imaged frames comprising the steps of: receiving, by a two-dimensional image sensor, light from a negative carrier illuminated by a light source, the light being either transmitted through or reflected from the original film and optically measured at a singular linear pixel portion or plural linear pixel portions of the sensor which are selected so as to be perpendicular to a conveying direction of the original film so as to thereby detect an edge between adjacent imaged frames of the original film, and conveying the original film by a distance equivalent to an interval distance between frames which corresponds to the size of the original film when the edge is detected.

15. A method for detecting and positioning imaged frames as claimed in claim 14, wherein the original film is conveyed slowly at a micro pitch while the edge between the imaged frames is being detected, and at a high speed after the edge has been detected.

16. A method for detecting and positioning imaged frames as claimed in claim 14, wherein the two-dimensional image sensor also detects image data on the original film.

17. A method for detecting and positioning imaged frames as claimed in claim 14, wherein the selection of a linear portion of the two-dimensional image sensor corresponding to one side of the opening of the negative carrier is conducted automatically.

* * * * *